United States Patent
Iftime et al.

(10) Patent No.: US 7,545,557 B2
(45) Date of Patent: Jun. 9, 2009

(54) COLOR DISPLAY DEVICE

(75) Inventors: Gabriel Iftime, Mississauga (CA);
Naveen Chopra, Oakville (CA); Peter M. Kazmaier, Mississauga (CA); Paul F. Smith, Oakville (CA); Hadi K. Mahabadi, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 194 days.

(21) Appl. No.: 11/554,159

(22) Filed: Oct. 30, 2006

(65) Prior Publication Data
US 2008/0100906 A1    May 1, 2008

(51) Int. Cl.
*G02B 26/00* (2006.01)
*G09G 3/34* (2006.01)

(52) U.S. Cl. ....................... 359/296; 345/107

(58) Field of Classification Search .............. 359/296, 359/900; 345/105, 107; 430/32, 34, 38; 204/450, 600
See application file for complete search history.

(56) References Cited

U.S. PATENT DOCUMENTS

| | | | |
|---|---|---|---|
| 3,668,106 A | 6/1972 | Ota | |
| 4,338,390 A | 7/1982 | Lu | |
| 5,278,020 A | 1/1994 | Grushkin et al. | |
| 5,290,654 A | 3/1994 | Sacripante et al. | |
| 5,593,807 A | 1/1997 | Sacripante et al. | |
| 6,113,810 A | 9/2000 | Hou et al. | |
| 6,387,581 B1 | 5/2002 | Moffat et al. | |
| 6,525,866 B1 | 2/2003 | Lin et al. | |
| 6,529,313 B1 | 3/2003 | Lin et al. | |
| 6,538,801 B2 * | 3/2003 | Jacobson et al. | 359/296 |
| 6,577,433 B1 | 6/2003 | Lin et al. | |
| 6,824,708 B2 * | 11/2004 | Iftime et al. | 252/299.01 |
| 6,850,355 B2 | 2/2005 | Liang et al. | |
| 6,858,266 B2 | 2/2005 | Iftime et al. | |
| 7,280,266 B1 * | 10/2007 | Chopra et al. | 359/296 |
| 7,426,074 B2 * | 9/2008 | Tam et al. | 359/296 |
| 2002/0196390 A1 * | 12/2002 | Penterman et al. | 349/73 |
| 2003/0132925 A1 | 7/2003 | Lin et al. | |
| 2008/0211734 A1 * | 9/2008 | Huitema et al. | 345/3.1 |

OTHER PUBLICATIONS

U.S. Appl. No. 11/419,436, filed May 19, 2006 in the name of Naveen Chopra et al.
U.S. Appl. No. 11/169,924, filed Jun. 20, 2005 in the name of Ping Liu et al.

* cited by examiner

*Primary Examiner*—Scott J Sugarman
*Assistant Examiner*—Tuyen Q Tra
(74) *Attorney, Agent, or Firm*—Oliff & Berridge, PLC

(57) ABSTRACT

Set forth is a display device, including an electrophoretic display portion and a domain controlled liquid crystal portion, wherein the display device has a structure wherein either the electrophoretic display portion is arranged over the domain controlled liquid crystal portion or the domain controlled liquid crystal portion is arranged over the electrophoretic display portion. The display device is reimageable and can efficiently display full color images. Methods of reimageably displaying images with the display device are also included.

22 Claims, 4 Drawing Sheets

COLOR DISPLAY DEVICE

BACKGROUND

Described herein is a reimageable display device capable of displaying color images. More particularly, described is a color display device having a novel stacked structure of an electrophoretic display portion or layer and a domain controlled liquid crystal display portion or layer.

The reimageable display devices herein are thus capable of generating images, including full color images, that do not exhibit the darkness issues associated with the use of color filter overlays. Moreover, the display device is able to utilize a relatively simple architecture to display different colors in an efficient manner, particularly as compared to electrophoretic displays utilizing three or more differently colored particles. The electrophoretic displays herein may be used for any display application, and particularly any display application where the image displayed may be changed, including, for example, reimageable paper, electronic books, electronic signage, watch, monitor (television and/or computer) and/or cell phone displays, and the like.

Electrophoretic displays are well known in the art. An electrophoretic display generally comprises a suspension of one or two charged pigment particles colloidally dispersed in a clear or colored liquid of matching specific gravity and contained in a cell comprising two parallel and transparent conducting electrode panels. The charged particles are transported between the electrode panels under the influence of an electric field, and can therefore be made to display an image through appropriate application of the electric field on the electrodes.

U.S. Pat. No. 6,113,810, incorporated herein by reference in its entirety, describes a dielectric dispersion for use in an electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second plurality of particles.

U.S. Pat. Nos. 6,525,866 and 6,577,433, each incorporated herein by reference in its entirety, disclose an electrophoretic display liquid composition for use in an electrophoretic display device that has a multiplicity of individual reservoirs, each containing a display liquid comprised of two sets of particles dispersed in a transparent liquid system.

Electrophoretic display is thus based on the migration of charged particles suspended in an insulating fluid under the influence of an electric field. As discussed above, the display systems may comprise one-particle and two-particle systems. One-particle systems typically comprise one set of same color particles dispersed in a fluid that may have a color different from that of the particles. Two-particle systems typically comprise two sets of colored particles, with each set of particles having a different color dispersed in a fluid that is typically colorless/clear.

Another type of reimageable display is described in, for example, U.S. Pat. Nos. 6,858,266, incorporated herein by reference in its entirety. These systems comprise the use of domain controlled liquid crystals.

One approach for color devices involves the use of color filter overlays on black and white two-particle display systems, for example as in U.S. Pat. No. 6,850,355.

While known electrophoretic display devices, compositions and processes for displaying images are suitable for their intended purposes, a need remains for a color electrophoretic display with a simpler, cost effective design that efficiently achieves good color and good brightness.

SUMMARY

Described herein is a display device comprising an electrophoretic display portion and a domain controlled liquid crystal portion, wherein the display device has a structure wherein either the electrophoretic display portion is arranged over the domain controlled liquid crystal portion or the domain controlled liquid crystal portion is arranged over the electrophoretic display portion. The display device is reimageable and can efficiently display full color images. Methods of reimageably displaying images with the display device are also included.

Thus, described herein is a display device, comprising an electrophoretic display portion and a domain controlled liquid crystal portion, wherein the display device has a structure wherein either the electrophoretic display portion is arranged over the domain controlled liquid crystal portion or the domain controlled liquid crystal portion is arranged over the electrophoretic display portion.

In embodiments described is a method of displaying a color image with a display device, wherein the display device has a structure wherein an electrophoretic display portion is arranged over a domain controlled liquid crystal portion, the method comprising displaying a first color of one of two sets of differently colored particles in the electrophoretic display portion by applying an electric field to move the first colored particles to a top of the electrophoretic display portion, displaying a second color of He other one of the two sets of differently colored particles in the electrophoretic display portion by applying an electric field to move the second colored particles to a top of the electrophoretic display portion, displaying a third color of a background surface or substrate by applying an electric field to move the first colored particles and the second colored particles of the electrophoretic display portion to side portions of the electrophoretic display portion and by applying a separate electric field to the domain controlled liquid crystal portion to induce a change to a weakly scattering, substantially transparent state, and displaying a white color by applying an electric field to move the first colored particles and the second colored particles of the electrophoretic display portion to side portions of the electrophoretic display portion and by applying a separate electric field to the domain controlled liquid crystal portion to induce a change to a strongly scattering state.

In further embodiments, described is a method of displaying a color image with a display device, wherein the display device has a structure wherein a domain controlled liquid crystal portion is arranged over an electrophoretic display portion, the method comprising displaying a first color of one of two sets of differently colored particles in the electrophoretic display portion by applying an electric field to the domain controlled liquid crystal portion to induce a change to a weakly scattering, substantially transparent state and by applying a separate electric field to move the first colored particles to a top of the electrophoretic display portion, displaying a second color of the other one of the two sets of differently colored particles in the electrophoretic display portion by applying an electric field to the domain controlled liquid crystal portion to induce a change to a weakly scattering, substantially transparent state and by applying a separate electric field to move the second colored particles to a top of the electrophoretic display portion, displaying a third color of a background surface or substrate by applying an electric field to the domain controlled liquid crystal portion to induce a change to a weakly scattering, substantially transparent state and by applying a separate electric field to move the first colored particles and the second colored particles of the electrophoretic display portion to side portions of the electrophoretic display portion, and displaying a white color by applying a separate electric field to the domain controlled liquid crystal portion to induce a change to a strongly scattering state.

EMBODIMENTS

Figure 1:
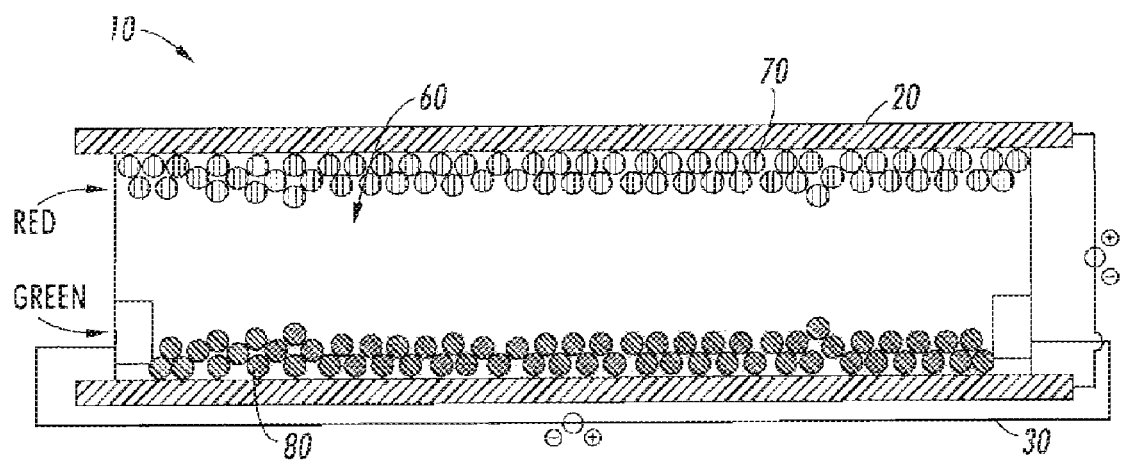
FIG. 1 illustrates an example stricture of an electrophoretic display portion of the display device.

The reimageable display devices described herein include at least two portions, at least one portion being an electrophoretic layer and at least one portion being a domain controlled liquid crystal portion. The portions are arranged one over another, thereby forming a stacked arrangement. Portion refers to, for example, a part of the display device, including a layer of the device. A layer includes not only the electrophoretic display layer or the domain controlled liquid crystal composition layer itself, but also the additional portions or components of such layers, for example including the conductive substrates and/or electrodes of these layers.

In embodiments, reimageable refers to, for example, the ability of the display device to change the image displayed. That is, the image displayed may be changed, and a single image is not permanent in the display device. For example, in embodiments, reimageable indicates that the device is not restricted to use in displaying only a single image and thereafter must be discarded. The image displayed by the device may in fact be changed an extremely large number of times, for example as with a display monitor such as a television monitor or electronic signage.

Each of the separate portions or layers will first be described, with the stacked arrangement of portions and overall operation and display of images with the device being explained thereafter.

Electrophoretic Display Portion

The electrophoretic display portion or layer comprises a display region located between substrates, at least one of the substrates being transparent and comprising a viewing side, with respect to a viewer viewing an image formed by the device, of the electrophoretic display portion of the device.

Any suitable display device design may be used. That is, any suitable design for an electrophoretic display layer may be used without limitation. As an example of a suitable electrophoretic display design not specifically described herein that may nevertheless be used with the present display medium, U.S. Pat. No. 6,788,449, incorporated herein by reference in its entirety, is identified.

In embodiments, at least one of the substrates may be a conductive substrate and/or may comprise or include an electrode layer. Both the substrate and electrodes may be substantially transparent to a viewer, such that a viewer does not visibly perceive the substrate and/or electrodes.

The electrodes may be in the form of a pattern. For example, the pattern may be such that a single electrode or a portion of an electrode is associated with one or more pixels or subpixels of the display device. Such a pattern allows for appropriate control over individual portions of the display layer such that an overall desired image can be formed through the separate control of the individual portions of the display associated with different electrodes.

Conductive substrates may be used. Any suitable materials may be used without limitation, for example including materials presently known and used or that may be used in the future in the art. At least one of the conductive substrates, in particular at least the top conductive substrate through which the images formed by the electrophoretic portion of the device may be viewed, should be transparent in order to enable such viewing. Both substrates may be transparent, if desired. The bottom or back substrate need not be transparent, and may instead be, for example, a light reflecting or light absorbing material, or a colored background substrate. As suitable materials that may be used as conductive substrates, mention may be made of conductive polymer films, for example polymer films coated with a transparent conductive material such as indium tin oxide (ITO), such as polyethylene terephthalate (PET) films, for example MYLAR (Du Pont), polyethylene naphthalate (PEN) films, polyethersulfone (PES) films and the like, conductive glass films, such as ITO coated glass, and conductive thin metals. For transparency, ITO coated polymer films and glass are suitable. The substrates may either be flexible or rigid, depending on whether a flexible or rigid device is desired.

The substrates that sandwich the electrophoretic display region therebetween may have a length and width corresponding to the overall length and width of the display device. The substrates thus may be continuous, unitary, films that are not present as separated pieces over one or a few individual pixels of the electrophoretic portion of the display device, although a plurality of segregated substrates may also be used. The substrates may be made to be as thin as possible while still maintaining appropriate conductive properties and structural integrity. For example, the substrates may have a height, or thickness, of from about 10 microns to about 500 microns, such as from about 10 to about 250 microns or from about 20 to about 100 microns.

The electrophoretic display region located between the substrates may have a thickness of from, for example, about 5 to about 1,000 μm, such as from about 10 to about 500 μm or from about 20 to about 350 μm.

The display region is comprised of a multiplicity of pixels that make up the overall display region of the device. A multiplicity refers to, for example, from about 2 to about 100,000,000 or more, such as from about 100 to about 50,000,000 or from about 1,000 to about 1,000,000. Thus, for example, if each of the multiplicity of pixels were about 100 μm across, a square of 1,000×1,000 pixels (or about a 4 inch×4 inch display) would have about 1,000,000 total pixels.

Each pixel, or each subpixel if desired, of the display region of the electrophoretic display portion may be segregated from adjacent pixels or subpixels through the use of any physical spacer material and the like. Each pixel may have a width of from about 10 μm to about 5,000 μm, such as from about 10 μm to about 3,000 μm or from about 10 μm to about 500 μm. One or more of the pixels, for example all or substantially all of the pixels, may be further subdivided into three or more subpixels. Here again, any suitable spacer material, that may be the same or different from the spacer material used to segregate individual pixels, may be used in subdividing the pixels into three or more subpixels. The subpixels may be made to have a width of from about 5 μm to about 1,000 μm, such as from about 10 μm to about 500 μm or from about 10 μm to about 100 μm. The display medium to be used within the pixels and/or subpixels contains particles of a size smaller than the width,/diameter of the pixel and/or subpixel in order for the electrophoretic display portion to function.

The pixels/subpixels thus define a multiplicity of individual reservoirs that each contain a display medium. As will be detailed further below, the display medium is comprised of at least two sets of differently colored particles dispersed in a dielectric fluid. Desirably, the dielectric fluid is substantially transparent and substantially colorless. However, in embodiments, the fluid may be colored, for example through dispersion of colorants such as dyes therein, which color may complement the colors of the colored particles in the display medium. Reservoir refers to, for example, any unit such as a pixel or subpixel containing, or capable of containing, display medium therein, and includes, for example, units separated by a spacer material such as, for example, units separated by a physical device such as ribs and the like, units defined by pockets, cavities or bubbles formed in a single sheet or between two sheets, units comprised of capsules or microcapsules in a sheet or layer, and the like.

Thus, any suitable spacer design may be used. For example, the spacer may be of the type described in U.S. patent Publication No. 2003-0132925 A1, incorporated herein by reference in its entirety, or of any of the types described in U.S. application Ser. No. 11/419,436, incorporated herein by reference in its entirety. Common examples of suitable spacers include ribs, for example of a plastic material, and optionally in sheet form, for example as a web-like sheet, microcapsules, plastic sheets with pockets therein, and the like.

FIG. 1 illustrates an embodiment of an electrophoretic display portion of the display device. Shown in FIG. 1 is a single reservoir 10 of the electrophoretic portion of a display device. The portion includes a top, viewing side substrate 20, for example a conductive ITO coated glass electrode substrate. On the opposite side of the portion is a rear substrate, in this case comprised of a rear electrode 30. Voltage may be applied to each reservoir 10 of the electrophoretic portion individually, which voltage creates application of an appropriate electric field to the pixel to manipulate movement of the colored particles in the display medium therein so as to cause the pixel to display a desired color to a viewer viewing the device through the top substrate. In addition, the reservoir includes lateral electrodes 40 on either side of the reservoir. These lateral electrodes permit the particle sets in the display medium to be drawn to the sides of the reservoir through application of an appropriate electric field across the lateral electrodes so that the reservoir appears colorless to a viewer. The reservoir 10 includes therein a display medium 60, the display medium providing at least two colors for the display device as will be described below. The display medium includes two differently colored sets of particles therein, in this case shown as a red set of particles 70 and a green set of particles 80, dispersed in a substantially transparent or colorless dielectric fluid. The two sets of differently colored particles typically have a different or opposite charge so as to be differently manipulated by an electric field applied to the reservoir, as will be discussed below.

Each individual reservoir may contain a display medium comprised of at least two sets of colored particles in a dielectric fluid. Each set of particles should exhibit a different color. Thus, each reservoir is capable of exhibiting each of the at least two different colors.

Color refers to, for example, the overall absorption characteristic within the same range of wavelengths of the electromagnetic spectrum. Thus, differently colored sets of particles exhibit a color, that is, an absorption characteristic, different from each other. For example, if a first set of particles exhibits a red color, then a second differently colored set of particles will exhibit a different shade of red or a different color altogether, for example such as green.

The reservoirs may include more than two different colors, for example by including additional highlight color particles in the display medium, although the control of the display device may become more complex in effecting the display of an image.

The display medium of the electrophoretic display portion may thus comprise at least two sets of differently colored particles dispersed in a transparent dielectric fluid such as a liquid system (although it may be useful to also color/tint the liquid system) or air or gas, the two sets of particles exhibiting different, desirably contrasting color and different charging properties from each other.

The dielectric fluid may be comprised of a single fluid, or it may be a mixture of two or more fluids, which mixture of fluids may either be miscible with each other or immiscible as described above. The display medium may comprise the dielectric fluid in amounts from, for example, about 30% to about 95%, such as from about 40% to about 90% or from about 40% to about 80%, by weight of the display medium, and comprise the particles in a total amount of for example, about 5% to about 70%, such as from about 10% to about 60% or from about 20% to about 60%, by weight of the display medium. Each set of differently colored particles may be contained in the display medium in approximately equal amounts, or in different amounts as appropriate. For example, each set of colored particles in the display medium may comprise from about 5% to about 50% by weight, for example from about 5% to about 40% or from about 5% to about 30% by weight, of the display medium. The fluid and the sets of particles therein also may have substantially matched densities, fur example densities that are within about 10% of each other, or more specifically within 5% of each other or within 2% of each other.

The dielectric fluid may be comprised of any suitable fluid known in the art for display fluids. The choice of fluid may be based on concerns of chemical inertness, density matching to the particles to be suspended therein and/or chemical compatibility with the particles. In embodiments, the suspending fluid may have a low dielectric constant, for example, about 4 or less, such as about 0.5 to about 2. The viscosity of the fluid may be relatively low at the temperatures of operation in order to permit the particles to move therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the colored particles therein, and a specific gravity substantially equal to the colored particles, for example within about 10% of each other. Additionally, the fluid may be chosen to be a poor solvent for some polymers, which is advantageous for use in the fabrication of particles because it increases the range of polymeric materials useful in fabricating particles.

Organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbon's in the ISOPAR™ (Exxon), NORPAR™ (a series of normal paraffinic liquids from Exxon), SHELL-SOL™ (Shell), and SOLTROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly(chlorotrifluoroethylene) polymer or KRYTOX™ polymers (Dupont).

Typically, hydrocarbon fluids such as ISOPAR M are used for electrophoretic applications due to their low cost, good dielectric strength, low volatility, and nonreactivity. In embodiments, the fluid may be a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like.

The fluid may include therein a thermally reversible gelling agent having a melting point temperature of at least about 35° C., for example as described in co-pending application Ser. No. 11/169,924, incorporated herein by reference in its entirety.

In embodiments, the fluid is substantially free of charge control additives and other ionic species that may affect the charging behavior of the display medium and/or the particles dispersed therein. See, for example, U.S. patent application Ser. No. 11/419,436, incorporated herein by reference in its entirety. In these embodiments, the display medium desirably exhibits an electrical conductivity of about $10^{-11}$ to about $10^{-15}$ S/m, such as from about $10^{-12}$ to about $10^{-14}$ S/m or from about $10^{-12}$ to about $10^{-13}$ S/m. However, in other embodiments, the fluid and/or particle sets may contain additives such as surface modifiers to modify the surface energy or charge of the particles, such as charge control agents, dispersants, and/or surfactants. See, for example, U.S. Pat. No. 6,529,313, incorporated herein by reference in its entirety.

The display medium may be comprised of two immiscible liquids. Such a two-layer fluid system may be achieved using to fluids with differing-densities and that are immiscible with each other. For example, 3M's fluoroether and Exxon's ISOPAR™ are a suitable combination of immiscible fluids. Fluoroether, being denser, rests on the bottom, while ISOPAR™, being less dense, rests on top. The particles of the display medium may have a density that is in between the densities of the two immiscible liquids so that they rest at the interface between the two layers.

Various embodiments of particle sets to be dispersed in the fluid of the display medium are next described.

In embodiments, the display medium includes at least two sets of differently colored particles. For example, a first set of colored particles may exhibit a red color while a second set of particles may exhibit a green color. Other different color combinations may also be used, as desired, for example combinations of at least red and green sets of particles, at least green and blue sets of particles, and the like. The differently colored sets of particles may each exhibit a different charge, for example a different extent of a same sign, charge, or a different sign charge. In embodiments using two sets of differently colored particles one set may have a positive charge and the other set a negative charge. These opposite charges make it easy to display each of the two colors, for example simply by switching the current/applied electric field through the top/bottom electrodes so that one or the other set of particles will be attracted to the top viewing side of the electrophoretic display portion.

In embodiments, described is a low electrical conductivity electrophoretic display medium, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the display medium is thus comparable to that of the dielectric fluid. The particles of the display medium may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs (μC) per gram (that is, on the order of $10^{-6}$ C/g), such as from about ±0.1 to about ±20 μC/g, from about ±0.2 to about ±10 μC/g or from about ±0.3 to about ±5 μC/g.

As the particles of the display medium, any particle made by any suitable process may be used. Thus, particles made by both physical grinding methods, in which the material of the particles is formed as a mass that is then crushed and ground to the desired average particle size, and chemical build-up methods, in which the particles are grown individually within a reaction medium to the desired average particle size, both of which types of methods are well known in the toner art, may be used. The particles may be made to have an average size of from, for example, about 100 nm to about 100 μm, such as from about 200 nm to about 50 μm or from about 0.5 μm to about 25 μm. The particles typically have a size less than the size of the reservoirs of the display device in which the display medium will be contained so that the particles are free to move within the reservoirs.

The particles may be neat pigments, dyed (laked) pigments, pigment/polymer composites, dyed or pigmented agglomerated polymer particles and the like. As the colorant of the particles, dyes, pigment, mixtures of dyes, mixtures of pigments or mixtures of dyes and pigments may be used. Particles and/or colorant of particles may also include laked, or dyed, pigments, in which a dye is precipitated on the particles or the particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt.

Typical manufacturing techniques for the above particles are drawn from the liquid toner and other arts and include ball milling, attrition, jet milling, and the like. A pigmented polymer particle may be made by, for example, compounding a pigment in the polymer. The composite material is then (wet or dry) ground to a desired size. It may then optionally be added to a carrier liquid and milled under high shear for several hours to a final particle size and/or size distribution.

Chemical processes that may be used in forming the particles include, for example, emulsion aggregation, dispersion polymerization, mini- or micro-emulsion polymerization, suspension polymerization, precipitation, phase separation, solvent evaporation, in situ polymerization, or any process of microencapsulation. Emulsion aggregation is a desirable process to use as it is able to achieve particles with a substantially uniform size and size distribution.

Polymers that may be used for the pigmented particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific example include, for example, polyethylene, polypropylene, polymethylmethacrylate, polyisobutylmethacrylate, polystyrene, polybutadienie, polyisoprene, polyisobutylene, polylauryl methacrylate, polystearyl metliacrylate, polyisobornyl methacrylate, poly-t-butyl methacrylate, polyethyl methlacrylate, polymethyl acrylate, polyethyl acrylate, polyacrylonitrile, copolymers of two or more of these materials, an-d mixtures thereof.

While pigment/polymer composite particles, for example composite particles created by a physical-chemical process such as grinding/attrition of pigment/polymer or by surface treatment/grafting of stabilizing polymeric groups on the surface, may be used herein, such composite particles may have polydispersed particles that exhibit variable charging characteristics. Thus, in embodiments, the particles for the display medium are emulsion aggregation particles, for example including polyester resin based emulsion aggregation particles and styrene-acrylate or acrylate resin based emulsion aggregation particles. Such particles are chemically grown and tend to be substantially monodisperse in size, that is have a substantially same size so that there is a relatively small particle size distribution, and substantially spherical in shape. Another advantage to emulsion aggregation particles is that the particle surface is substantially completely passivated by the binder resin, which may eliminate the contribution of the colorant, such as pigment, to the particle charge.

Examples of suitable polyester resins for the emulsion aggregation particles include polyethylene terephthalate, polypropylene terephthalate, polybutylene terephthalate, polypentylene terephthalate, polyhexalene terephthalate, polyheptadene terephthalate, polyoctalene terephthalate, polyethylene sebacate, polypropylene sebacate, polybutylene sebacate, polyethylene adipate, polypropylene adipate, polybutylene adipate, polypentylene adipate, polyhexalene adipate, polyheptadene adipate, polyoctalene adipate, polyethylene glutarate, polypropylene glutarate, polybutylene glutarate, polypentylene glutarate, polyhexalene glutarate, polyheptadene glutarate, polyoctalene glutarate polyethylene pimelate, polypropylene pimelate, polybutylene pimelate, polypentylene pimelate, polyhexalene pimelate, polyheptadene pimelate, poly(propoxylated bisphenol fumarate), poly(propoxylated bisphenol succinate), poly(propoxylated bisphenol adipate), poly(propoxylated bisphenol glutarate), mixtures, copolymers or combinations thereof, and the like.

Polyester toner particles, formed by the emulsion aggregation process, are illustrated in a number of patents, such as U.S. Pat. Nos. 5,593,807 and 5,290,654, each of which is incorporated herein by reference in their entirety. Further examples of suitable polyester particles include those having lithium and/or sodium sulfonated polyester resin as disclosed in a number of patents, such as U.S. Pat. No. 6,387,581, incorporated herein by reference in its entirety. The polyester may comprise any of the polyester materials described in the aforementioned references.

An example process for preparing the polyester based emulsion aggregation particles may comprise charging a polyester resin emulsion, for example an aqueous based emulsion optionally containing one or more surfactants, into a reactor, and adding a colorant to the reactor while stirring. A wax dispersion may optionally be added. The mixture is stirred and heated to a desired temperature, for example from about 40° C. to about 70° C., such as from about 45° C. to about 70° C. or from about 40° C. to about 65° C. A solution of an aggregating agent is pumped into the mixture to initiate growth/aggregation of the polyester particles. An additional amount of resin emulsion may then be added, where it is desired to form a shell that is substantially free of coloring agent such as dyes, pigments or mixtures thereof on the core aggregated colored particles. The temperature of the reactor may then be raised towards the end of the reaction to, for example, from about 45° C. to about 75° C., such as from about 50° C. to about 75° C. or from about 45° C. to about 70° C., to allow for appropriate spherodization and coalescence to achieve the desired average particle size and shape. The slurry may be cooled, washed and dried.

Examples of suitable acrylate resin binders for the emulsion aggregation particles include, for example, polymers such as poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methlacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), mixtures thereof and the like.

Acrylate toner particles created by the emulsion aggregation process are illustrated in a number of patents, such as U.S. Pat. No. 5,278,020, incorporated herein by reference in its entirety. The acrylate may comprise any of the materials described in the aforementioned references. In embodiments, the acrylate polymer may be a styrene-acrylate copolymer, such as styrene-butyl acrylate that may also be comprised of β-carboxyethylacrylate.

Thus, the binder may be specifically comprised of a styrene-alkyl acrylate, for example a styrene-butyl acrylate copolymer resin, or a styrene-butyl acrylate-β-carboxyethyl acrylate polymer resin.

The monomers used in making the acrylate polymer binder may include any one or more of, for example, styrene, acrylates such as methacrylates, butylacrylates, β-carboxyethyl acrylate (β-CEA), etc., butadiene, isoprene, acrylic acid, methacrylic acid, itaconic acid, acrylonitrile, benzenes such as divinylbenzene, etc., and the like. Known chain transfer agents can be utilized to control the molecular weight properties of the polymer. Examples of chain transfer agents include dodecanethiol, dodecylmercaptan, octanethiol, carbon tetrabromide, carbon tetrachloride, and the like in various suitable amounts, for example of about 0.1 to about 10 percent by weight of monomer, and preferably of about 0.2 to about 5 percent by weight of monomer. Also, crosslinking agents such as decanedioldiacrylate or divinyl benzene may be included in the monomer system in order to obtain higher molecular weight polymers, for example in an effective amount of about 0.01 percent by weight to about 25 percent by weight, preferably of about 0.5 to about 10 percent by weight.

An example method for making acrylate based emulsion aggregation particles may include first mixing resin emulsion, for example an aqueous based emulsion optionally containing one or more surfactants, a colorant, and a coagulating agent at a temperature at or above the glass transition temperature (Tg) of the resin, such as 5° C. to about 50° C. above the Tg of the resin, which Tg is usually in the range of from about 50° C. to about 80° C. or is in the range of from about 52° C. to about 65° C. The particles are permitted to grow or aggregate to a desired size. An outer shell material for the aggregated particles, for example consisting essentially of binder resin that is substantially free of coloring agent such as dyes, pigments or mixtures thereof on the core aggregated colored particles, may then be added, for example to form a shell on the aggregated particles having a thickness of about 0.1 to about 2 micron. The aggregation is then halted, for example with the addition of a base. The particles may then be coalesced, for example at an elevated temperature such as from about 60° C. to about 98° C., until a suitable shape and morphology is obtained. Particles are then optionally subjected to further processing, for example wet sieved, washed by filtration, and/or dried.

As surfactants for use in making emulsion aggregation particles as discussed above, examples include anionic, cationic, nonionic surfactants and the like. Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. NEOGEN R-K available from Daiichi Kogyo Seiyaku Co. Ltd.(Japan), or Tayca Power BN2060 from Tayca Corporation (Japan) consist primarily of branched sodium dodecyl benzene sulphonate. Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}, C_{15}, C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. SANISOL B-50 consists primarily of benzyl dimethyl alkonium chloride. Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. ANTAROX 897 consists primarily of alkyl phenol ethoxylate.

In embodiments, the emulsion aggregation particles are made to have an average particle size of from about 0.5 to about 25 μm, for example about 5 to about 15 μm or about 5 to about 12 μm. The particle size may be determined using any suitable device, for example a conventional Coulter counter.

The emulsion aggregation particles also may have a substantially monodisperse size such that the upper geometric standard deviation (GSD) by volume for (D84/D50) is in the range of from about 1.1 to about 1.25. The particle diameters at which a cumulative percentage of 50% of the total toner particles are attained ale defined as volume D50, and the particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). The upper GSDv value for the toner particles indicates that the toner particles are made to have a very narrow particle size distribution.

The emulsion aggregation particles also may be made to be highly circular, thereby exhibiting better flow properties with respect to movement within the display medium. In other words, rounder/smoother particles have a higher electrophoretic mobility, and thus a faster response time within the display. The circularity is a measure of the particles closeness to a perfect sphere. A circularity of 1 identifies a particle having the shape of a perfect circular sphere. The emulsion aggregation particles may have an average circularity of about 0.92 to about 0.99, for example from about 0.94 to about 0.98 or from about 0.95 to about 0.97. The circularity may be determined using the known Malvern Sysmex Flow Particle Image Analyzer FPIA-2100.

In addition to the polymer binder and the colorant, the particles may also contain a wax dispersion. Linear polyethylene waxes such as the POLYWAX® line of waxes available from Baker Petrolite are useful. Of course, the wax dispersion may also comprise polypropylene waxes, other waxes known in the art, including carnauba wax and the like, and mixtures of waxes. The toners may contain from, for example, about 1 to about 15% by weight of the particles, on a solids basis, of the wax, for example from about 3 to about 12% or from about 5 to about 10% by weight.

In addition, the colored particles may also optionally contain a coagulant and/or a flow agent such as colloidal silica. Suitable optional coagulants include any coagulant known or used in the art, including the well known coagulants polyaluminum chloride (PAC) and/or polyaluminum sulfosilicate (PASS). The coagulant is present in the toner particles, exclusive of external additives and on a dry weight basis, in amounts of from 0 to about 3% by weight of the toner particles, for example from about greater than 0 to about 2% by weight of the toner particles. The flow agent, if present, may be any colloidal silica such as SNOWTEX OL/OS colloidal silica. The colloidal silica is present in the toner particles, exclusive of external additives and on a dry weight basis, in amounts of from 0 to about 15% by weight of the toner particles, for example from about greater than 0 to about 10% by weight of the toner particles.

Although not required, the toner may also include additional known positive or negative charge additives in effective suitable amounts of, for example, from about 0.1 to about 5 weight percent of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

The colored particles may be colored through inclusion of at least one colorant in the particle binder. As the colorant, any suitable pigment, dye, mixture of pigments, mixture of dyes or mixture of pigments and dyes may be used.

As dyes for the colorant of the particles, examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BR (Hodogaya Chemical); Kayanol Red 3BL (Nippon Kayaku); Spirit Fast Yellow 3G; Aizen Spilon Yellow C-GNH: (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm. and Haas); Orasol Blue GN (Ciba); Savinyl Blue GILS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF).

Examples of pigments that may be used as the particles herein, or that may be used as the colorant in polymer particles, include neat pigments such as, for example, titania, barium sulfate, kaolin, zinc oxide, carbon black and the like. The pigment should be insoluble in the suspending fluid. Additional pigments may include, for example, carbon black such as REGAL, 330 carbon black, acetylene black, lamp black, aniline black, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK.; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL, (Clariant); Lumogen Yellow D0790 (BASF); Suco-Yellow L1250 (BASF); Suco-Yellow D1355 (BASE); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); mixtures thereof and the like.

In polymer particles, the colorant may be included in the particles in an amount of from, for example, about 0.1 to about 75% by weight of the particle, for example from about 1 to about 50% by weight or from about 3 to about 25% by weight of the particle.

In any of the foregoing particle embodiments, the particles may also include one or more external additives on the surfaces thereof. Such external additives may be applied by blending, for example with a Henschel blender. In embodiments, the external additive package may include one or more of silicon dioxide or silica ($SiO_2$), titanium dioxide or titania ($TiO_2$), titanic acid, cerium oxide, calcium or zinc stearate, and the like. The particles may have an average size (diameter) of from about 5 nm to about 250 nm. Mixtures of differently sized particles may also be used, for example a first silica having an average primary particle size, measured in diameter, in the range of, for example, from about 5 nm to about 50 nm, such as from about 5 nm to about 25 nm or from about 20 nm to about 40 nm and a second silica having an average primary particle size, measured in diameter, in the range of, for example, from about 100 nm to about 200 nm, such as from about 100 nm to about 150 nm or from about 125 nm to about 145 nm. The external additive particles may also be treated with a surface material.

In embodiments, the external additives may be used to impart charge to the particles. For example, a silica particle treated with polydimethylsiloxane (PDMS) or hexamethyldisilazane (HMDS) can impart a positive charge. A titanic acid treated with isobutyl trimethoxysilane can impart a negative charge.

To display a desired color of one of the at least two colored particles in the display medium at a desired reservoir, an appropriate current is applied across the top and bottom substrates and/or electrodes of the electrophoretic display portion. For example, where a first set of particles of a first color carry a negative charge and a second set of particles having a second color different from the first color of the first set of particles carry a positive charge, applying an electric field such that the top substrate or electrode has a positive charge will attract the first set of negatively charged particles and repulse the second set of particles. Thus, at this reservoir, the viewer would perceive the first color of the first set of particles. If on the other hand the applied electric field is switched such that the top substrate or electrode has a negative charge, such will attract the second set of positively charged particles and repulse the first set of particles. Thus, at this reservoir, the viewer would perceive the second color of the second set of particles. For the viewer to perceive substantially no color at this reservoir, the top and bottom substrates/electrodes may be made to have no applied electric field, but an electric field is applied via the lateral electrodes so as to attract the positive and negative charged particles to respective sides of the reservoir, thereby making the viewer perceive no color at this reservoir. This is because the gathering of the particles at the lateral electrodes is typically so small in area that a viewer cannot perceive the gathered particles. In this manner of controlling the color (or lack of color) at each reservoir or sets of reservoirs, an image can be developed and displayed across the display device.

In embodiments, the electrophoretic particles may first be in-situ or field-induced charged to have an appropriate charge, and thereafter subjected to manipulation via application of an appropriate electric field as discussed above. For example, the charging may be accomplished by application of an electric field having a strength of about 0.05 V/μm to about 5 V/μm for about 0.001 seconds to about 5 hours, such that the charging results in the particles of the sets of differently colored particles having the above charge. The electric field applied to manipulate movement of the particles in the reservoirs may be applied at about 0.1 V/μm to about 25 V/μm.

Thus, in operating the display device so as to form an image therewith, an electric field, in particular a reversible direct current or an alternating current, is applied via the electrodes in order to move desired ones of the sets of colored particles in the display medium at desired locations of the display device to be displayed so as to display a desired color surface thereof to a viewer. The individual reservoirs, or groups of individual reservoirs, for example a group of from about 1 to about 50 reservoirs or from about 1 to about 10 reservoirs, may be independently addressable, that is, a separate electric field may be applied to each individual or small group of reservoirs in order to generate an appropriate color at that individual location of the device. Appropriate larger sets or groups of different ones of the reservoirs may also be associated with a same driving electrode, if desired. Thus, in a display, each reservoir or a group of reservoirs may represent a pixel or subpixel of an image, and each pixel or subpixel may thus be separately controlled to generate a desired overall image from the device. Each pixel or subpixel can be individually addressed, and a full page image can thus be generated. Control methods, including hardware/software, for controlling each reservoir and/or electrode of the display device in a manner enabling an overall image to be shown are known in the display arts, and any such control method may be applied herein. To permit individual addressability the size of the electrodes may be the same as or smaller than the size of the individual reservoirs or a small group of reservoirs of the display device, enabling individual control of each. In this manner, the electric field applied to each can be individually controlled. Also, the size of the electrodes can be different from (for example, larger than) the size of the reservoirs, thereby enabling more than one reservoir to be controlled by a single electrode. Thus, the pattern of the electrodes does not need to line up with the pattern of individual reservoirs of the display layer. Any of the foregoing can be done by, for example, appropriate patterning of the conductive path on one or more of the conductive substrates. An example of the patterning of electrodes can be found in, for example, U.S. Pat. No. 3,668,106, incorporated herein by reference in its entirety.

In embodiments, the switching between the colored states of the electrophoretic display portion may be accomplished without any significant degradation of the portion for any desired number of times such as for example hundreds, thousands, millions of times or higher.

Moreover, in embodiments, the displaying of the colors or the displaying of the transparent state in the electrophoretic portion is substantially stable. Substantially stable refers to, for example, the fact that each of these states is capable of maintaining its display state from a period of time after the applied electric field is turned off.

Domain Controlled Liquid Crystal Display Portion

The display device herein also includes a domain controlled liquid crystal display portion or layer. In this portion or layer, the display switches between a white or a substantially colorless or transparent state. Such is achieved by the portion being switchable between small size domains in which light is strongly scattered such that a viewer perceives the color white in this state, and large domains in which light is weakly scattered such that a viewer perceives no color.

A domain controlled liquid crystal display is described in U.S. Pat. No. 6,858,266, incorporated herein by reference in its entirety. In such a display, a liquid crystal composition including a liquid crystal and a liquid crystal domain stabilizing compound, wherein the liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light, is contained in a liquid crystal containment structure defining a space for the liquid crystal composition. The liquid crystal composition may be changed from the weakly scattering state to the strongly scattering state by applying a first electric field to yield an unstable state of a single liquid crystal domain and then reducing the first electric field to a strongly scattering state inducing level to yield the strongly scattering state, and changed from the strongly scattering state to the weakly scattering state by applying a second electric field weaker than the first electric field but stronger than the strongly scattering state inducing level.

In embodiments, the liquid crystal in both the smaller liquid crystal domains and the larger liquid crystal domains possesses helical axes that are randomly oriented. In embodiments, there is a liquid crystal composition comprising (a) a liquid crystal and (b) a polymerized liquid crystal domain stabilizing compound comprising a dipolar monomer and a non-dipolar monomer.

The liquid crystal composition thus includes a liquid crystal and a liquid crystal domain stabilizing compound. The liquid crystal may be any liquid crystal capable of forming a plurality of liquid crystal domains. In embodiments, the liquid crystal may be, for example, a chiral nematic (that is, cholesteric) liquid crystal or a nematic liquid crystal. The liquid crystal may be a single compound or a mixture of two or more different compounds.

Nematic liquid crystals with positive dielectric anisotropy may be composed of a hard core made of a polyaromatic ring and a flexible moiety composed of a hydrocarbon group. In embodiments, the nematic liquid crystals suitable for the purposes of this invention are composed of a hard core made of two or more monocyclic aromatic groups and a flexible moiety made of an alkyl group of variable length, which may be optionally substituted. Most often, commercially available nematic liquid crystals are mixtures of nematic molecules.

Many suitable nematic liquid crystals are mixtures of alkyl-biphenylnitrile or alkyl-terphenylnitrile molecules and are commercially available and would be known to those of ordinary skill in the art in view of this disclosure. Alkyl herein includes, for example, straight and branched chain alkyls, and having from one to about 20 or more carbon atoms in the chain. Examples include nematic liquid crystal BL mixtures available at EM Industries, Inc., BL001 (E7), BL002 (E8), BL033 (version of BL002) and BL087, and 5CB (commercially available at Sigma-Aldrich). Below is an example structural formula for nematic liquid crystal compounds that are included in the commercially available E7 and of 5CB:

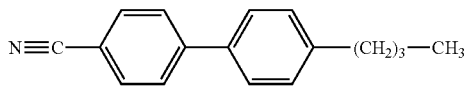

where E7 is a mixture of compounds where n is 4, 6, and 7, and 5CB is a single compound where n is 5.

Cholesteric liquid crystals possessing a positive dielectric anisotropy with a helical pitch chosen to reflect for example in the FR or Near IR regions are suitable for use herein. The cholesteric liquid crystals generally can be categorized into three main types. In a first main type, the cholesteric liquid crystal may be a mixture of a cholesteric liquid crystal mixture and a nematic liquid crystal in an amount sufficient to produce desired helical pitch length. Suitable cholesteric liquid crystal mixtures include, for example, BL mixtures available from EM Industries, Inc. (BL088, BL 90, BL94 and BL108 as a few examples). The helical pitch is tuned to the desired range by mixing this cholesteric liquid crystal mixture with a nematic liquid crystal described herein.

In a second main type, the cholesteric liquid crystal may be made from a mixture of a nematic liquid crystal and a chiral material in an amount sufficient to generate a desired pitch length. Any chiral material soluble into a nematic liquid crystal is suitable for use herein as long as it is of high enough enantiomeric or diastereoisomeric purity and it has high enough twisting power. High performance chiral materials are commercially available at Merck, for example ZLI4571, ZLI4572 (R1011), S811 and R811. In particular, R1011 and S811 may include compounds with the structural formulas:

In a third main type, the cholesteric liquid crystal can be a nematic liquid crystal single compound which is also chiral (hence the name of chiral nematic liquid crystal). Optionally, the chiral nematic liquid crystal single compound may be mixed with a chiral nematic liquid crystal mixture or with a chiral non-liquid crystal material to tune the helical pitch to the desired value. A few examples of such single compound chiral nematic liquid crystals are shown below.

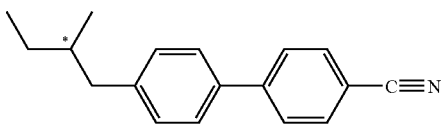

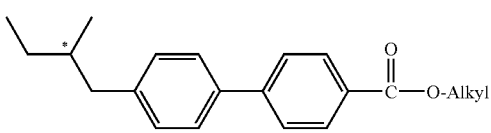

The liquid crystal domain stabilizing compound encompasses any compound that (1) induces (or allows) (along with an applied electric field) the switching between the smaller liquid crystal domains and larger liquid crystal domains, and (2) maintains the liquid crystal domain size after switching when the electric field is zero. It is believed that the liquid crystal domain stabilizing compound places itself mostly at the boundaries of the liquid crystal domains, and only a low percentage of it, if any, is placed within the liquid crystal helices. In embodiments the liquid crystal domain stabilizing compound is an organic dipolar compound such as those illustrated herein. An organic dipolar compound as illustrated in the formulas (1) through (6) is a conjugated structural unit possessing an electron acceptor group and an electron acceptor group. This structural unit has a permanent dipole moment large enough so that it can be rotated by an applied electric field.

S811

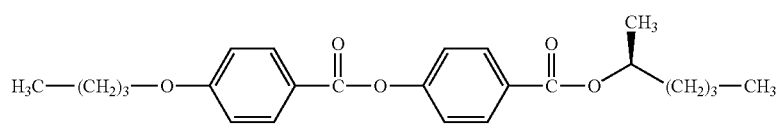

R1011

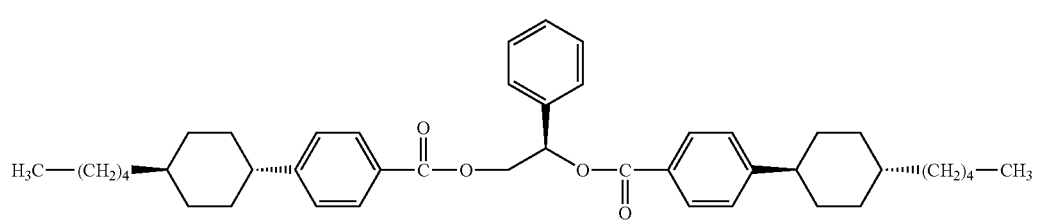

Liquid crystal domain stabilizing compounds of formula (1) through formula (6):

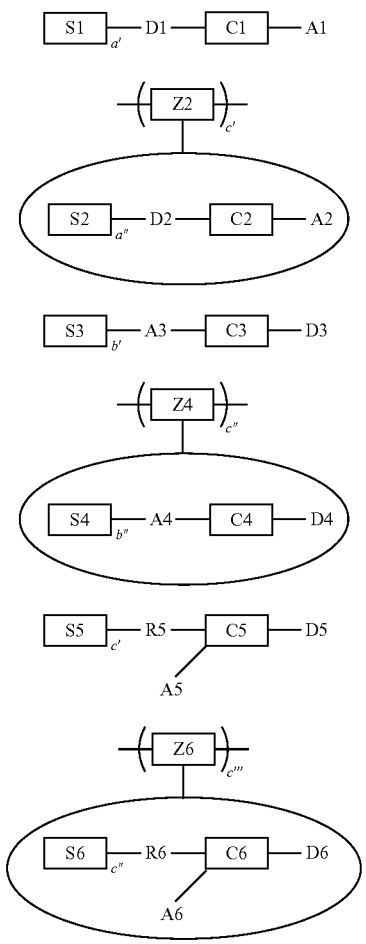

Formulas (1) though (6) schematically represent useful dipolar compounds suitable for use herein. While the different moieties are connected schematically through single bonds, they may possess single, double or triple bonds, "Small molecule" liquid crystal domain stabilizing compounds are exemplified by compounds corresponding to formulas (1), (3), and (5). "Macromolecule" liquid crystal domain stabilizing compounds that are an oligomer/polymer are exemplified by compounds corresponding to formulas (2), (4), and (6). A polymerized liquid crystal domain stabilizing compound comprising a dipolar monomer and a non-dipolar monomer (discussed herein) is also considered a "macromolecule" liquid crystal domain stabilizing compound. In embodiments, the liquid crystal domain stabilizing compounds may absorb at a portion of the spectrum that is compatible with the operation of the photonic device; for instance, where the photonic device is a display device, the liquid crystal domain stabilizing compounds may absorb in the UV or slightly in the visible range. In embodiments, the liquid crystal domain stabilizing compounds are colorless having little absorbance for example in the visible range so that when dissolved in the liquid crystal composition in a few percents, a thin film of such a liquid crystal composition appears colorless.

The electron donor moiety (D1 through D6) may be any suitable atom or group capable of donating electrons, which in embodiments according to Hammett equation may possess a negative Hammett constant ($\sigma p$). In embodiments, the electron donor moiety (D1 through D6) is an atom that may require one or more additional moieties in order to fulfill its valence requirements (for example, a nitrogen atom has three valences). In embodiments, the electron donor moiety (D1 through D6) may be selected from the group consisting of (a) an atom selected from the group consisting of N, O, S, P, Cl, Br, and I, where the valence of the atom is satisfied by bonding with the liquid crystal compatibilizing moiety (S1 through S6) and/or conjugated bridging moiety (C1 through C6) and optionally with the polymerizable moiety (Z2, Z4, Z6); (b) an atom selected from the group consisting of N, O, S, and P bonded to the liquid crystal compatibilizing moiety (S1 through S6) and/or conjugated bridging moiety (C1 through C6) and optionally with the polymerizable moiety (Z2, Z4, Z6), where the atom also is bonded to at least one other moiety to satisfy the valence of the atom; (c) ferrocenyl; (d) azulenyl; and (e) at least one aromatic heterocyclic ring having from about 5 to about 30 atoms (referring to number of carbon atoms and heteroatom(s)) where the heteroatom is, for example, oxygen (like for example furan, benzofuran, dibenzofuran), sulfur (like for example 1,4-dithiin, benzo-1,4-dithiin, dibenzo-1,4-dithiin, tetrathiafulvalene, thiophen, benzothiophen, dibenzothiophen), or nitrogen (like for example pyrrole, indole, carbazole, pyrazole, imidazol), selenium (like for example selenophen, benzoselenophen, dibenzoselenophen), and tellurium (like for example tellurophen, benzotellurophen, dibenzotellurophen).

In embodiments, the electron donor moiety (D1, D2) is selected from the group consisting of (a) an atom selected from the group consisting of N, O, S, and P, where the valence of the atom is satisfied by bonding with S1/S2 and C1/C2; (b) an atom selected from the group consisting of N, O, S, and P bonded to S1/S2 and C1/C2, where the atom also is bonded to at least one other moiety to satisfy the valence of the atom; (c) ferrocenyl; (d) azulenyl; and (e) at least one aromatic heterocyclic ring as described herein.

The other moiety or moieties to satisfy the valence of the atom selected as the electron donor moiety (D1 through D6) may be for instance a hydrogen atom, or a hydrocarbon group such as the following (a) a straight alkyl chain having for example 1 to about 20 carbon atoms, particularly 1 to about 12 carbon atoms, such as pentyl, decyl and dodecyl; (b) a branched alkyl group having for example 3 to about 40 carbon atoms, particularly 3 to about 30 carbon atoms such as isopropyl, isopentyl and 2-propyl-pentyl; (c) a cycloalkyl group having for example 3 to about 30 carbon atoms, particularly 4 to 7 carbon atoms in the cycle, such as cyclopentyl and cyclohexyl; and (d) an aryl group, an arylalkyl group or alkylaryl group having for example 7 to about 30 carbon atoms such as p-methyl-benzyl, 3-(p-ethyl-phenyl)-propyl and 5-(1-naphthyl)-pentyl.

The conjugated bridging moiety (C1 through C6) may be any suitable group through which electrons can pass from the electron donor moiety (D1 through D6) to the electron acceptor moiety (A1 through A6). In embodiments, the conjugated bridging moiety (C1 through C6) is a π-electron conjugated bridge that is composed of for example (there is no overlap among the categories (a), (b), and (c) described below): (a) at least one aromatic ring such as one, two or more aromatic rings having for instance from about 6 carbon atoms to about 40 carbon atoms such as —$C_6H_4$—, and —$C_6H_4$—$C_6H_4$—; (b) at least one aromatic ring such as one, two or more aromatic rings conjugated through one or more ethenyl or ethynyl bonds having for instance from about 8 carbon atoms to about 50 carbon atoms such as —$C_6H_4$—CH═CH—$C_6H_4$—, and —$C_6H_4$—C≡C—$C_6H_4$—; and (c) fused aromatic rings having for instance from about 10 to about 50 carbon atoms such as 1,4-$C_{10}H_6$ and 1,5-$C_{10}H_6$.

The liquid crystal compatibilizing moiety (S1 through S6) may be any suitable group that increases miscibility of the liquid crystal domain stabilizing compound with the liquid crystal. The liquid crystal compatibilizing moiety (S1 through S6) may be 1, 2, 3, or more groups, where each group may be the same or different from each other. The liquid crystal compatibilizing moiety (S1 through S6) may be, for example, the following: (a) a substituted or trisubstituted hydrocarbon having for example 1 to about 30 carbon atoms; (b) a heterocyclic moiety having for example from 5 to about 15 atoms (referring to number of carbon atoms and heteroatoms(s), where the heteroatom can be for instance N, O, S, P, and Se. Examples include piperidine, ethyl-piperidine, and/or methylpyrrolidine; (c) a hetero-acyclic moiety having for example from 5 to about 15 atoms (referring to number of carbon atoms and heteroatom(s), where the heteroatom can be for instance N, O, S, P, and Se). Examples include glycol and polyglycol ethers, alcohol moieties like for example 2-hydroxy-ethyl, and thiol moieties like for example ethyl-2-methyl-ethyl-thioether.

When the liquid crystal compatibilizing moiety (S1 through S6) is a hydrocarbon, the hydrocarbon may be for example the following (a) a straight chain alkyl group having for example 2 to about 30 carbon atoms, particularly 2 to about 12 carbon atoms, such as pentyl, decyl and dodecyl; (b) a branched alkyl group having for example 3 to about 40 carbon atoms, particularly 3 to about 30 carbon atoms such as isopropyl, isopentyl and 2-propyl-pentyl; (c) at least one cycloalkyl group such as one, two or more bonded cycloalkyl groups having for example 3 to about 8 carbon atoms, particularly 4 to 7 carbon atoms in the cycle, such as cyclopentyl and cyclohexyl. Optionally, one or more hydrogen, atoms of the cycloalkyl group may be replaced with for example an alkyl group having for example 1 to about 20 carbon atoms, an arylalkyl group having for example 3 to about 30 carbon atoms, a cycloalkyl group having for example 3 to about 8 carbon atoms, particularly 4 to 7 carbon atoms in the cycle, or an alkylcycloalkyl group having for example 4 to about 30 carbons; and (d) an arylalkyl group or alkylaryl group having for example 7 to about 30) carbon atoms such as p-methyl-benzyl, 3-(p-ethyl-phenyl)-propyl and 5-(1-naphthyl)-pentyl.

In embodiments, the liquid crystal compatibilizing moiety (S1 through S6) may be a hydrocarbon optionally substituted with for example a liquid crystal moiety, a heterocyclic moiety optionally substituted with for example a liquid crystal moiety, or a hetero-acrylic moiety optionally substituted with for example a liquid crystal moiety. The liquid crystal moiety may be composed of for example (i) a flexible portion-hard core moiety composed of a flexible moiety such as an alkyl chain containing from about 4 to about 10 carbon atoms connected to a hard core comprised of a cyan (CN) group connected to a biphenyl or terphenyl, where the flexible portion-hard core moiety includes a connecting moiety; or (ii) a cholesteryl group including a connecting moiety.

To create the connecting moiety in the liquid crystal moiety, an atom (for example, hydrogen) may be removed from a compound described herein as a liquid crystal. The removed atom is replaced with a connecting moiety which is either an atom (like for example O, N, S, or P) or a group (like for example —O—C(O)—, —C(O)—, —O—$(CH_2)_n$—O—) having at least two available valences and which is capable of bonding the liquid crystal moiety to the rest of the liquid crystal compatibilizing moiety (S1 through S6). For example, in compound 1-V, a hydrogen atom from a liquid crystal compound $CH_3$—$(CH_2)_4$—$C_6H_4$—$C_6H_4$—CN was replaced with an O atom, resulting in liquid crystal moiety, to allow bonding with the liquid crystal domain stabilizing compound through —$CH_2$ group. The whole group is assigned as S1. The term "liquid crystal moiety" is used even if the removal of atom or atoms from a compound described herein as a liquid crystal results in a liquid crystal moiety which does not possess a liquid crystal nature.

The polymerizable moieties Z2, Z4 and Z6 may be any monomers that may be polymerized to form an oligomer/polymer. Suitable monomers include those having a double bond (—CH═$CH_2$) or triple bond capable of being polymerized such as acryl or ethenyl. One or more hydrogen atoms in the monomer may be optionally replaced with for example the following (a) alkyl chains having from 1 to about 10 carbon atoms; (b) substituted alkyl chains such as alkoxy, halide substituted alkyl groups (halides like F, Cl, Br, and I), and amino-alkyl groups where the alkyl moiety has from 1 to about 10 carbon atoms. Examples of polymerizable moieties are $H_2C$═CH—C(O)—O-(acryl), $H_2C$═$C(CH_3)$—C(O)—O-(methacryl), $H_2C$═$C(C_2H_5)$—C(O)—O-(ethacryl), —CH═$CH_2$(vinyl), and —$C(CH_3)$═$CH_2$. The polymerizable moiety $Z_i$(i=2, 4, 6) may be attached to $S_i$(i=2, 4, 6), $D_i$(i=2, 4, 6), $C_i$(i=2, 4, 6), $A_i$(i=2, 4, 6) or R6.

The values e', e" and e'" represent the degree of polymerization and are numbers ranging for example from 1 to about 100 or higher.

The values a', a", b', b", c', c" are integers such as for example from 1 to 3.

A first example group of liquid crystal domain stabilizing compounds are encompassed by formula (1) and formula (2). In formula (2) the repetitive dipolar structural unit composed of S2, D2, C2, and A2 is similar to compounds represented by formula (1) except that one of the moieties of the dipolar structural unit is bound to Z2.

The electron acceptor moiety (A1, A2) may be any suitable atom or group capable of accepting electrons. In embodiments, the electron acceptor moiety (A1, A2) is an electron withdrawing functional moiety which according to Hammett equation possesses a positive Hammett constant (σp). The electron acceptor moiety (A1, A2) may be for example the following (a) an aldehyde (—CO—H); (b) a ketone (—CO—R) where R may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl; (c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethylphenyl)-propyl and 5-(1-naphthyl)-pentyl; (d) a carboxylic acid (—COOH); (e) cyano (CN); (f) nitro ($NO_2$); (g) nitroso (N=O); (h) a sulfur-based group (for example, —$SO_2$—$CH_3$; and —$SO_2$—$CF_3$); (i) a fluorine atom; (j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30) carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (k) a boron atom.

A second example group of liquid crystal domain stabilizing compounds is encompassed by formula (3) and (4). In compounds of formula (3) and (4), the liquid crystal compatibilizing moieties (S3, S4) are bonded to the electron acceptor moieties (A3 and A4, respectively). In formula (4), the repetitive dipolar structural unit composed of S4, D4, C4, and A4 is similar to compounds represented by formula (3) except that one of the moieties of the dipolar structural unit is bound to Z4.

The electron acceptor moiety (A3, A4) may be any suitable atom or group capable of accepting electrons and which possess a valence capable of forming a bond with the liquid crystal compatibilizing moiety (S3, S4). In embodiments, the electron acceptor moiety (A3, A4) is an electron withdrawing functional moiety that according to Hammett equation possesses a positive Hammett constant ($\sigma p$). The electron acceptor moiety (A3, A4) may be for example the following: (a) a carbonyl group (—CO—); (b) a carboxyl group (—COO—); (c) a sulphone (—$SO_2$—); (d) an alkene (—CH=C(R)—) where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (e) an imine group (—C=N—).

A third example group of liquid crystal domain stabilizing compounds is encompassed by formulas (5) and (6). In embodiments of compounds of formula (5) and (6), the liquid crystal compatibilizing moiety (S5, S6) is bonded to the conjugated bridging moiety (C5, C6), through a "direct bond" (i.e., the spacer moiety (R5, R6) is absent) or through an optional spacer moiety (R5, R6).

In formula (6), the repetitive dipolar structural unit composed of S6, R6, D6, C6, and A6 is similar to compounds represented by formula (5) except that one of the moieties of the dipolar structural unit is bound to Z6. A5 and A6 are electron acceptor moieties identical to A1 and A2. In addition, D5 and D6 are electron donor moieties identical to D3 and D4.

The electron acceptor moiety (A5, A6) may be any suitable atom or group capable of accepting electrons. In embodiments, the electron acceptor moiety (A5, A6) is an electron withdrawing functional moiety that according to Hammett equation possesses a positive Hammett constant ($\sigma p$). The electron acceptor moiety (A5, A6) may be for example the following: (a) an aldehyde (—CO—H); (b) a ketone (—CO—R) where R, may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl; (c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; (d) a carboxylic acid (—COOH); (e) cyano (CN); (f) nitro $NO_2$); (g) nitroso (N=O); (h) a sulfur-based group (for example, —$SO_2$—$CH_3$; and —$SO_2$—$CF_3$); (i) a fluorine atom; (j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (k) a boron atom.

The spacer moiety (R5, R6) may be any atom or group having at least two available valences and which is capable of forming bonds with both the conjugated bridging moiety (C5, C6) on one side and with the liquid crystal compatibilizing moiety (S5, S6) on the other side, and which may be for example the following: (a) a direct bond (that is, the spacer moiety (R5, R6) is absent); (b) an oxygen atom; (c) a sulfur containing moiety such as a sulfur atom or a sulfur group like —SO—, —$SO_2$—; (d) a glycol ether unit having a formula —(O—$CH_2$—$CH_2$)$_n$—O— where n is an integer from 1 to about 5; (e) a nitrogen containing moiety which is a nitrogen atom or of type —N(R)—, where R may be for example a hydrogen, a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

Specific examples of compounds, and methods of making the compounds, of each of formulas (1) to (6) may be found in U.S. Pat. No. 6,858,266.

In embodiments, the liquid crystal composition can include a single liquid crystal domain stabilizing compound. In other embodiments, the liquid crystal composition can include two, three, or more different liquid crystal domain stabilizing compounds. In embodiments, there may be present a combination of a macromolecule liquid crystal domain stabilizing compound and a small molecule liquid crystal domain stabilizing compound. The different liquid crystal domain stabilizing compounds may be present in the liquid crystal composition in any suitable equal or unequal ratio ranging for example from about 10% (first liquid crystal domain stabilizing compound): about 90% by weight (second liquid crystal domain stabilizing compound) to about 90% (first liquid crystal domain stabilizing compound): about 10% by weight (second liquid crystal domain stabilizing compound).

The liquid crystal composition is prepared, for example, by mixing a liquid crystal of a selected helical pitch with the liquid crystal domain stabilizing compound along with one or more other optional ingredients (for example, such as a dispersant and a non-dipolar co-monomer) as described herein. The liquid crystal composition may be homogenized by shaking and/or stirring.

The liquid crystal domain stabilizing compound has a solubility in the liquid crystal ranging for example from about 0.1% to 100% by weight at room temperature (about 23° C. to about 27° C.). An elevated temperature ranging from about 40 to about 130° C. may be used to facilitate dissolution of the liquid crystal domain stabilizing compound in the liquid crystal. Insoluble amounts of the liquid crystal domain stabilizing compound may be optionally removed by filtration.

In embodiments, an initiator or initiators may be used to facilitate synthesis of a "macromolecule" liquid crystal domain stabilizing compound. The initiator may be any suitable compound that facilitates polymerization of the monomers used in forming the oligomer/polymer. In embodiments, the polymerization is done in situ, by using thermal or photochemical initiation. In the case of thermal initiation classical initiators can be used and they are known to those skilled in the art. Examples of thermal initiators include for example 2,2'-azobisisobutyronitrile (AIBN) or benzoyl peroxide. Polymerization is carried at temperatures between about 30 to about 100° C., depending on the desired initiation rate and on the thermal initiator used in the process. A thermal initiator may be added in an amount from about 0.01% to about 10%, or from about 0.1% to about 1%, with respect to the total amount of the liquid crystal composition.

Photochemical initiation may be done by using visible light initiation. Classical UV initiation may also be used, although in embodiments the monomers may absorb too much in the UV range, slowing down or stopping the polymerization. Visible light initiators include for example camphoroquinone or H-Nu 470. They initiator the polymerization when subjected to 470 nm wavelength light. The photochemical initiator may be added in an amount of about 0.01% to about 3%, or from about 0.1% to about 1%, with respect to the total amount of liquid crystal composition. When photochemical initiation is performed, the liquid crystal composition contains also the amount of initiator. To prevent premature polymerization, while preparing the liquid crystal composition, in these embodiments, the mixture is heated for only short periods of time for example about 1 to about 5 minutes at a lower temperature ranging for example from about 30 to about 50° C.

A dispersant or a mixture of two or more different dispersants may be optionally included in the liquid crystal composition. The dispersant(s) may be present in an amount ranging from about 0.1% to about 20% by weight, or from about 1% to about 10% by weight, based on the weight of the liquid crystal composition. Where two or more different dispersants are used, the different dispersants may be present in the liquid crystal composition in any suitable equal or unequal ratio ranging for example from about 10% (first dispersant): about 90% by weight (second dispersant) to about 90% (first dispersant): about 10% by weight (second dispersant). In embodiments, the dispersant may be added to those liquid crystal compositions containing a "small molecule" liquid crystal domain stabilizing compound. In other embodiments, the dispersant may be added to those liquid crystal compositions containing a "macromolecule" liquid crystal domain stabilizing compound. The dispersant may be any suitable compound that, being present at the boundaries of liquid crystal domains, acts as a barrier to association of neighboring liquid crystal domains, preventing their growth and re-alignment after the voltage is turned off. In embodiments, the addition of a dispersant results in longer term stability of the white state (described herein) and in improved uniformity of the white state. The dispersant in embodiments is typically miscible with the liquid crystal composition.

Dispersants are for instance non-aqueous surfactants that are typically used for dispersing particles in high resistivity media. Dispersants useful herein are for example neutral non-ionic molecules or oligomers containing hydrophilic and hydrophobic groups.

For compatibility with the liquid crystal composition, dispersants may possess relatively large alkyl chains, containing for example from about 5 to about 50 carbon atoms, or from about 8 to about 30 carbon atom chains. The alkyl chains can be straight or may optionally be branched or may contain one or more aromatic rings, to increase compatibility with the liquid crystal composition. Dispersants include, but are not limited to the following: (a) polyoxyethylene glycol and derivatives thereof with a molecular weight from about 100 to about 3,000. Derivatives can be hydroxy-terminated polyoxyethylene glycols; polyoxyethylene alkyl ethers with an alkyl group containing from about 1 to about 30 carbon atoms, which can be for example lauryl, cetyl, stearyl, oleyl; polyoxyethylene esters of fatty acids where the fatty acid contains from about 1 to about 30 carbon atoms, like for example oleic acid, lauric acid, and stearic acid; (b) alkanolamides resulted from condensation of fatty acids with alkanolamines, having from 8 to about 60 carbon atoms; (c) aminoxides of general structure $R_1R_2R_3NO$ where the $R_1$, $R_2$ and $R_3$ groups are independently selected and contain from about 1 to about 30 carbon atoms; (d) sorbitan esters resulting from condensation of sorbitol with a carboxylic acid ester containing from about 2 carbon atoms to about 60 carbon atoms. Sorbitan esters useful for this invention are for example sorbitan monolaurate, sorbitan monostearate, sorbitan monopalmitate, sorbitan trioleate, and sorbitan tristearate; (e) glycerol and polyglycerol mono- and poly-esters where the ester groups contain from about 2 to about 30 carbon atoms, like for example stearate, oleate, decyl, and octyl; (f) polydimethylsiloxane polymers with a molecular weight from about 100 to about 3,000, terminated with a hydroxy group or with an alkyl, hydroxyalkyl or hydride group containing from about 0 to about 30 carbon atoms; (g) alkyl alcohols of a general formula R—OH where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; (h) non-ionic halogen containing surfactants, particularly fluorinated surfactants, possessing for example a perhalogenated hydrocarbon group. The halogen can be F, Cl, Br, or I. The non-ionic halogen-containing surfactants suitable herein can be made of for example: (h)(1) two different structural units, the first one having a perhalogenocarbon chain of the general structure, $C_nX_m$—(C is carbon; X is a halogen such as F, Cl, Br, or I), where the chain may be straight, branched or may be a perhalogenated arylalkyl chain, where n is an integer from about 1 to about 200 and m is an integer from about 3 to about 600; and the second structural unit which does not contain $C_nX_m$— units. The second structural unit may be hydrophobic when it is made of hydrocarbon chains or silicone groups, where the hydrocarbon chains can be a straight or branched alkyl, alkylaryl, arylalkyl or cycloalkyl chain containing from about 1 to about 200 carbon atoms. The second structural unit can be hydrophilic when containing a water compatible non-ionic structure. The hydrophilic structure may be for example a polyoxyethylated alcohol, a poly-propyleneoxide, an alkyl, a polyhydric alcohol, and an ethanethiol derivative; (h)(2) a single structural unit containing both a hydrophobic perhalogenocarbon chain and a hydrophilic group. Example examples are fluorinated polyethers like for example polytetrafluoro-ethylene and poly-hexafluoro-propeneoxide. (i) pentaerythritol ethers, esters with alcohols or carboxylic acids having from about 1 to about 30 carbon atoms and alkoxylate ethers of pentaerythritol where alkoxylate can be etlhoxylate or propoxylate; (j) sucrose esters and ethers with a carboxylic acid or an alcohol having from about 1 to about 30 carbon atoms. Optionally more than one sucrose hydroxyl groups may be reacted with the alcohol or with the carboxylic acid: (k) block copolymers of two or more monomers having a molecular weight from about 100 to about 5,000. Block copolymers may be for example polyethyleneglycol-co-polyethylene, polyethyleneglycol-co-polypropylene glycol, polyvinylalcohol-co-ethylene and polydimethylsiloxane-co-polyethyleneglycol.

The monomers of the "macromolecule" liquid crystal domain stabilizing compounds (for example, compounds of formulas (2), (4), and (6)) are referred herein as dipolar monomers. To illustrate the structure of the dipolar monomers, the dipolar monomer in the compound of formula (2) corresponds to S2, D2, C2, A2, and Z2 where e' is 1.

One, two or more different types of dipolar monomers may be used in the synthesis of each "macromolecule" liquid crystal domain stabilizing compound. In embodiments, the dipolar monomer(s) may be polymerized together with an optional non-dipolar monomer (one, two, or more different types of the non-dipolar monomer) in the synthesis of each "macromolecule" liquid crystal domain stabilizing compound. The dipolar monomer(s) and the optional non-dipolar monomer(s) may be used in any suitable equal or unequal ratio (by weight or by moles). The non-dipolar monomer may be referred herein as a non-dipolar co-monomer. The term "co-monomer" includes embodiments where there is one, two, or more different types of non-dipolar monomers used with one, two or more different types of dipolar monomers.

The non-dipolar monomer contains neither an electron donor moiety nor an electron acceptor moiety, in contrast to the example liquid crystal domain stabilizing compounds of formulas (1) through (6) which contain an electron donor moiety and an electron acceptor moiety. The non-dipolar monomer may be any suitable compound that improves solubility of the dipolar monomer and initiator into the liquid crystal composition. The non-dipolar monomer may be in a liquid state and contains one or more polymerizable functional groups. It is added in an amount from about 10% to about 300% by weight with respect to the amount of dipolar monomer, or from about 10% to about 50% by weight. In embodiments one, two or more non-dipolar monomers may be used. When more than one non-dipolar monomer is being used, the relative amount of each non-dipolar monomer may be from about 5% to about 95% by weight with respect the total amount of non-dipolar monomers. During the device fabrication process, the dipolar monomer(s) and non-dipolar monomer(s) are polymerized together inside the liquid crystal containment structure in the presence of the liquid crystal, initiator and optional dispersant. Due to the presence of the non-dipolar monomer(s), the structure of the macromolecular liquid crystal domain stabilizing compound incorporates the structural units of the non-dipolar monomer(s). In embodiments, the resulting liquid crystal domain stabilizing compounds are random copolymers (2, 3 or more monomers) containing dipolar structural units and non-dipolar structural units. In embodiments, the addition of the non-dipolar monomer may result in an improved uniformity of the transparent state. In embodiments without the added non-dipolar monomer, depending on the mixing time and temperature, the transparent state may exhibit a few slightly white spots, which may be the result of a non-homogeneous initial mixture due to some limited miscibility of some of the materials into the liquid crystal composition. These slightly white spots may disappear because of homogenization induced by the presence of the non-dipolar monomer.

The non-dipolar monomer may be monomers containing one or more (up to 6) polymerizable functional groups, bonded to a core. A generic formula is shown below for the non-dipolar monomer where n represents the number of polymerizable groups and is a number from 1 to about 6. The polymerizable group may be an acrylate, methacrylate, or ethylacrylate polymerizable functional group.

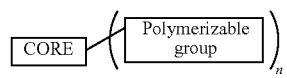

The monomer core may be: (a) mono- or poly-radical (up to 6 radicals) of a hydrocarbon having for example 1 to about 60 carbon atoms, where the hydrocarbon may be for example a straight chain alkyl group having for example 1 to about 60 carbon atoms, particularly 1 to about 20 carbon atoms, such as 1-pentyl, 1,2-pentyl, 1,3-pentyl, 1,5,10-decyl and 1,4,8,12-dodecyl; a branched alkyl group having for example 3 to about 50 carbon atoms, particularly 3 to about 30 carbon atoms such as isopropyl, isopentyl and 2-propyl-pentyl; a cycloalkyl group having for example 3 to about 30 carbon atoms, particularly with 4 to 7 carbon atoms in the cycle, such as cyclopentyl and cyclohexyl; an arylalkyl group or an alkylaryl group having for example 7 to about 60 carbon atoms such as p-methyl-benzyl, 3-(p-ethyl-phenyl)-propyl and 5-(1-naphthyl)-pentyl; and a bisphenol radical. Example non-dipolar monomers include nonyl methacrylate, lauryl acrylate and diacrylate, 1,4-butanediol-diacrylate, 1,3-butylene glycol diacrylate, trimethylolpropane triacrylate and propoxylated neopentyl glycol diacrylate; (b) glycol, polyoxyethylene glycols, alkoxylated glycols mono- and poly radicals with a molecular weight from about 100 to about 3,000.

Example non-dipolar monomers include ethoxylated lauryl acrylate, polyethylene glycol diacrylate, 2-(2-ethoxyethoxy) ethyl acrylate and ethoxylated nonyl phenol methacrylate, and phenoxyethyl in ethylacrylate, propoxylated neopentyl glycol diacrylate; (c) glycerol, alkoxylated and polyalkoxylated glycerol ethers mono- and poly-radical derivatives with a molecular weight from about 100 to about 3,000, where alkoxylate can be ethoxylate or propoxylate. Example non-dipolar monomers include glyceryl triacrylate, propoxylated glyceryl triacrylate; (d) pentaerythritol, and alkoxylated and polyalkoxylated ethers mono- and poly-radical derivatives thereof, with a molecular weight from about 100 to about 3,000, where alkoxylate can be ethoxylate or propoxylate. Example non-dipolar monomers include dipentaerythritol pentaacrylate, and ethoxylated dipentaerythritol pentaacrylate; (e) epoxy and modified epoxy. Example non-dipolar monomers include epoxy acrylate monomers which may be modified with an amine like for example CN2100 (Sartomer product), with a fatty acids like for example CN2101 (Sartomer product), and with chlorine like for example CN 2201 (Sartomer product); (f) radicals of alkoxylated and polyalkoxylated ethers incorporating heteroatom-containing hydrocarbon groups, with a molecular weight from about 100 to about 3,000. Example non-dipolar monomers include tris-(2-hydroxy ethyl)isocyanurate triacrylate, alkoxylated tetrahydrofurfuryl acrylate; (g) urethane and derivatives thereof with a molecular weight of about 100 to 3,000. Example examples of non-dipolar monomers are for example CN-962 (urethane acrylate, Sartomer product), CN-1963 (urethane methacrylate, Sartomer product) and CN-963B80 (urethane acrylate blended with SR-238, Sartomer product). Mixtures of the foregoing may also be used.

In embodiments, using both the non-dipolar co-monomer and the dispersant may be desired.

Regarding the amounts of the various ingredients to employ, the following illustrative proportions are provided: (a) liquid crystal: about 80% to about 98% by weight based on the weight of the liquid crystal composition; (b) liquid crystal domain stabilizing compound: about 2% to about 20% by weight based on the weight of the liquid crystal composition; (c) initiator: about 0.2% to about 3% by weight based on the weight of the liquid crystal composition; (d) dispersant: about 0.5% to about 5% by weight based on the weight of the liquid crystal composition; (e) non-dipolar co-monomer: about 1% to about 3% by weight based on the weight of liquid crystal composition. An illustrative example is as follows, where the percentages by weight are based on the weight of all ingredients in the liquid crystal composition: (a) liquid crystal: 95% (b) liquid crystal domain stabilizing compound: 3% (c) initiator: 0.5% (d) dispersant: 1% (e) non-dipolar co-monomer: 0.5%.

The present liquid crystal composition is capable of forming a strongly scattering state of a first plurality of smaller liquid crystal domains that strongly scatters a predetermined light wavelength or wavelengths and a weakly scattering state of a second plurality of larger liquid crystal domains that weakly scatters the predetermined light wavelength or wavelengths.

The existence of liquid crystal domains will now be discussed. In both strongly and weakly scattering states, the helical axes of the liquid crystal are not all perfectly oriented parallel to one another. In fact, in embodiments, the helical axes of the liquid crystal may be more or less randomly oriented. Domain boundaries appear at the edges where orientation of helical axes changes. This polydomain state is known as a focal-conic state.

In embodiments, for both the strongly scattering state and the weakly scattering state, the liquid crystal domains contact one another (that is, no void among them) and in the case of larger domains they have a lamellar shape. In the case of smaller domains, the difference between length and width is less significant. In a device where the volume occupied by the liquid crystal composition is typically fixed, the number of liquid crystal domains is inversely proportional with the domain size (i.e., domain number decreases with increased domain size if the domains contact one another with no voids between them). In embodiments, the smaller liquid crystal domains have a domain size range of for example from about 0.5 to about 10 micrometers, or any subset thereof such as from about 5 to about 10 micrometers. In embodiments, the larger liquid crystal domains have a domain size range as follows: (a) a length ranging for example from about 10 to about 40 micrometers, or any subset thereof such as from about 25 to about 30 micrometers, and (b) a width ranging for example from about 5 to about 20 micrometers, or any subset thereof such as from about 5 to about 10 micrometers.

The phrase "strongly scattering state" refers to transmission of 0% to about 20%, particularly, 0% to about 10% of the predetermined light wavelength or wavelengths and the phrase "weakly scattering state" refers to transmission of about 80% to 100%, particularly about 90% to 100% of the predetermined light wavelength or wavelengths. This definition implies that the back of the device is transparent when characterization by transmission spectroscopy is performed. In embodiments, values outside the light transmission ranges described herein are encompassed if there is sufficient difference in light scattering between the "strongly scattering state" and the "weakly scattering state" to enable the present device to function as for example a photonic device such as for instance a display device, an optical digital storage device, an optical switching device, or some other photonic device. The extent of light scattering depends upon a number of factors such as for example the predetermined light wavelength or wavelengths, the liquid crystal domain size, the particular liquid crystal, and the number of liquid crystal domains.

As noted herein, the phrases "weakly scattering state" and the "strongly scattering state" encompass a range of light transmission values. Consequently, for a particular liquid crystal and a predetermined light wavelength or wavelengths, there may be a single liquid crystal domain size range or a plurality of liquid crystal domain size ranges that yield the "weakly scattering state" and there may be a single liquid crystal domain size range or a plurality of liquid crustal domain size ranges that yield the "strongly scattering state." Thus, the "weakly scattering state" encompasses one or a plurality of liquid crystal domain states having the desired weakly light scattering attribute, where these various weakly scattering states may differ in the liquid crystal domain size range. Similarly, the "strongly scattering state" encompasses one or a plurality of liquid crystal domain states having the desired strongly light scattering attribute, where these various strongly scattering states may differ in the liquid crystal domain size range.

When the "weakly scattering state" and the "strongly scattering state" are described as being switchable between each other, this encompasses the following embodiments: (a) where the "weakly scattering state" has generally the same liquid crystal domain size range every time there is a switch to the "weakly scattering state," and where the "strongly scattering state" has generally the same liquid crystal domain size range every time there is a switch to the "strongly scattering state" (this embodiment may be accomplished for example by not varying from the procedures used to produce each of the multiple "weakly scattering states" and by not varying from the procedures used to produce each of the multiple "strongly scattering states"); (b) where during repeated switching between the "strongly scattering state" and the "weakly scattering state," the liquid crystal domain size range of the multiple "weakly scattering states" may differ (this embodiment may be accomplished by using for example different electric field strengths among the multiple "weakly scattering states"); and (c) where during repeated switching between the "strongly scattering state" and the "weakly scattering state," the liquid crystal domain size range of the multiple "strongly scattering states" may differ (this embodiment may be accomplished by using for example different electric field strengths among the multiple "strongly scattering states").

The number of liquid crystal domains can be for example in the hundreds, thousands, tens of thousands, or millions with a range of domain sizes. In embodiments, a number of the liquid crystal domains such as for example about 70% to 100% of the liquid crystal domains may change in size when switching occurs. However, in embodiments, some of the liquid crystal domains will remain unchanged in size when switching occurs.

In embodiments where the domain controlled liquid crystal portion is in a display device, the extent of light reflectance by the display device may be determined by reflectance spectrophotometry measured for instance for the whole visible spectrum (380 nm to 730 nm). Gretag spectrophotometer at normal angle with respect to the device surface may be used in order to measure the reflectance of the inventive devices, such light reflectance measurement procedures being well known to those skilled in the art.

The domain controlled liquid crystal portion includes a liquid crystal containment structure defining a space for the liquid crystal composition. The space has a thickness ranging for example from about 5 micrometers to about 50 micrometers. In embodiments, the predetermined light enters the space (and the liquid crystal composition) at an orthogonal angle or any other appropriate angle.

The structure may be substantially transparent to the predetermined light to allow the predetermined light to reach the liquid crystal composition. The phrase "substantially transparent" when used to describe the structure encompasses one or more substantially transparent sections and/or one or more openings. In addition, the phrase "substantially transparent" when used to describe the structure refers to, in embodiments, the transmission of about 60% to 100% of the predetermined light that enters the structure; light transmission values outside this example range are encompassed where such light transmission values enable the present device to function as for example a display device, an optical digital storage device, an optical switching device, or some other photonic device.

In embodiments, the display device also includes a colored (that is, non-white) surface positioned, for example, beneath a viewing side of the domain controlled liquid crystal portion or a viewing side of the electrophoretic display portion, to absorb a portion of the predetermined light that passes through the liquid crystal composition in the weakly scattering state where the liquid crystal composition may be disposed between substantially transparent sections of the structure and the colored surface. The extent of light absorption by the colored surface may be such that an observer sees the predetermined color (black, gray, red, green, or any other desired color) when looking through the substantially transparent sections of the structure and the liquid crystal composition at the colored surface. The colored surface may be for example a painted layer or a separate colored layer. The colored surface (whether a painted layer or a separate colored layer) needs to be thick enough so that it is not transparent to the incident light, that is, a viewer does not see anything through a device after painting or placing the colored layer. A separate colored layer may be for example fabricated from colored glass, colored paper or colored plastic. The colored layer may be attached to or held in place to the structure via for example an adhesive or a clamp.

In embodiments, the domain controlled liquid crystal portion is substantially transparent to the predetermined light to allow entry of the predetermined light into the structure, through the liquid crystal composition, and exit of the predetermined light from the structure in the weakly scattering state.

In embodiments, the liquid crystal containment structure is composed of two flat substrates or sections that are sealed around their edges and separated by spacers to define the space for the liquid crystal composition. The sections may be transparent, fabricated from, for example, glass or plastic materials. The internal sides of the transparent sections are coated with a conductive electrode layer, which constitute the electrodes required to apply different electric fields in order to switch the device to different states. The conductive electrode layers are substantially transparent. Typical materials for transparent electrodes include indium-tin oxide and the like, where the transparent electrodes have a resistivity of for example less than or equal to about 125 ohm/sq. The transparent substrates or surfaces and the electrodes thereof or thereon may be the same materials described above with respect to the electrophoretic display portion Spacers used to control the thickness of the space for the liquid crystal composition may be glass fibers or polymeric fibers or spheres. The spacers and materials thereof may be those described above for use in the electrophoretic display portion.

Fabrication of the liquid crystal containment structure may be accomplished by first dispensing glue on the edges of one of the sections, placing the second section on top, followed by curing to harden the glue. The glue can be either UV photocurable like for example Norland Optical Adhesives or thermo-curable like for example epoxy glues. A small opening is left unsealed, which is used for vacuum filling of the liquid crystal composition. Complete sealing of the filled liquid crystal containment structure can be accomplished with a thermally curable epoxy glue. In the case of a device containing monomers for a "macromolecule" liquid crystal domain stabilizing compound, polymerization of such monomers to obtain the "macromolecule" liquid crystal domain stabilizing compound is obtained by exposure to light or by heating (in the case of thermal initiation). Sealing not only provides structural stability to the liquid crystal containment structure but also may prevent air leakage into the containment structure except at the opening and this enables air-filling.

As used herein, the "transparent state" refers to weakly scattering state composed of the larger liquid crystal domains. In this state, the domain controlled liquid crystal portion appears substantially colorless and is substantially transparent or see-through.

A light source (external to the present device or incorporated into the device) may generate the predetermined light supplied to the display device, including to the electrophoretic display portions and the domain controlled liquid crystal portions. Any suitable light wavelength or wavelengths may be employed such as those wavelengths useful for a display device, an optical digital storage device, an optical switching device, or some other photonic device. The suitable wavelength or wavelengths may be in any part of the spectrum such as the visible spectrum ranging for example from about 380 nm to about 730 nm, and the infrared spectrum ranging for example from about 730 nm to about 2000 nm, particularly from about 800 nm to about 1700 nm. The light source may be, for example, a laser, a light bulb, or sunlight. In the context of an optical switching device, the "predetermined light" refers to the wavelength(s) of the light that is turned ON or turned OFF by the optical switch device. When the device is used as a display, the "predetermined light" is ambient visible light.

An electric field generating apparatus (external to the present device or incorporated into the device) produces the desired electric fields in both the electrophoretic display portions and the domain controlled liquid crystal portions. The electric field generating apparatus may be a single device or two or more devices that can produce the desired electric fields. The electric field generating apparatus can produce an electric field ranging for example from 0 V/µm to about 10 V/µm, particularly from about 1 V/µm to about 10 V/µm, a voltage ranging from 0 V to about 250 V, particularly from about 20 V to about 120 V.

To change either the initial state (prior to the application of any electric field to the liquid crystal composition) or the weakly scattering state to the strongly scattering state, the electric field generating apparatus produces for instance a first electric field of sufficient strength to form an unstable state of a single liquid crystal domain (that is, no separate liquid crystal domains are visually observed). The first electric field can be a value ranging for example from about 2 V/µm to about 10 V/µm, particularly from about 3 V/µm to about 7 V/µm. The first electric field is applied for a time ranging for example from about 1 msec to about 1 sec, particularly from about 10 msec to about 100 msec. The first electric field is then reduced to a strongly scattering state inducing level to yield the strongly scattering state. The liquid crystal domains spontaneously arrange into the strongly scattering state at the strongly scattering state inducing level. The strongly scattering state inducing level corresponds to an electric field ranging for example from 0% to about 30% of the first electric field, particularly from 0 to about 10% of the first electric field. For instance, the strongly scattering state inducing level corresponds to an electric field ranging from 0% to about 5% of the first electric field, particularly 0%. The strongly scattering state inducing level is applied for a time ranging for example from about 10 msec to about 1 sec, particularly from about 10 msec to about 100 msec.

To change either the initial state or the strongly scattering state to the weakly scattering state, the electric field generating apparatus produces for instance a second electric field weaker than the first electric field but stronger than the strongly scattering state inducing level. The second electric field is greater than the strongly scattering state inducing level by a value ranging for example from about 30% to about 70%, particularly from about 40% to about 60% of the difference between the first electric field and the strongly scattering state inducing level. For instance, the second electric field may be from about 0.5 V/µm to about 4 V/µm, particularly from about 0.75 V/µm to about 3 V/µm. The second electric field is applied for a time ranging for example from about 10 msec to about 1 sec, particularly from about 20 msec to about 200 msec.

In embodiments, the switching between the weakly scattering state and the strongly scattering state may be accomplished without any significant degradation of the device for any desired number of times such as for example hundreds, thousands, millions of times or higher.

In embodiments, the strongly scattering state and/or the weakly scattering state may be substantially stable. Substantially stable here refers to, for example, the fact that each of these states is capable of maintaining its characteristics as strongly scattering or weakly scattering for a period of time after the applied electric field is turned off. Within the time frame for stable, some decay may occur over time such as a change in the liquid crystal domain size range but such a change in embodiments should not change a strongly scattering state to a weakly scattering state or a weakly scattering state to a strongly scattering state. The length of time that the strongly scattering state and the weakly scattering state are stable depends on a number of factors such as the type of liquid crystal, the type and concentration of the liquid crystal domain stabilizing compound, and the like. In embodiments, the length of time that the strongly scattering state and the weakly scattering state are stable after the applied electric field is turned off is sufficient for the device to function as any type of photonic device such as a display device, an optical switching device, an optical digital storage device, and the like, such a stable time period lasting for example from at least about 10 seconds and up such as minutes, perhaps hours, days, or even longer, particularly from about 10 seconds to about 20 minutes. For example, for a display device, the term stable refers to, for example, a long enough time so that a document written by applying a number of electric fields can be read when the power is turned off. In other words, the display maintains the written image for a long enough time to be readable at zero voltage. For example, the image is stable for a minimum of about 10 seconds. Some little decay may occur within the specified time, but this does not affect significantly the image, which is still perfectly readable. In an optical switching device, the term stable means the strongly scattering state and the weakly scattering state are capable of persisting until the next generation of an electric field to perform the switching.

The term unstable when referring to the unstable state of the single liquid crystal domain produced by the first electric field means that this state immediately changes when the applied electric field is turned off or when the applied electric field is significantly lowered, for example, by at least about 50%. Immediately means less than about 0.5 seconds. In other words, this state is lost so fast so that an observer may not detect it after the applied electric field is turned off. In embodiments of the present invention, this unstable state produced by the first electric field may have the following characteristics: (a) a single liquid crystal domain (with no imperfections); (b) a homotropic state having an ordered structure with no liquid crystal helices; (c) liquid crystal molecules are perpendicular to the surfaces defining the space for the liquid crystal composition; and (d) transparent to all light wavelengths.

Figure 2:
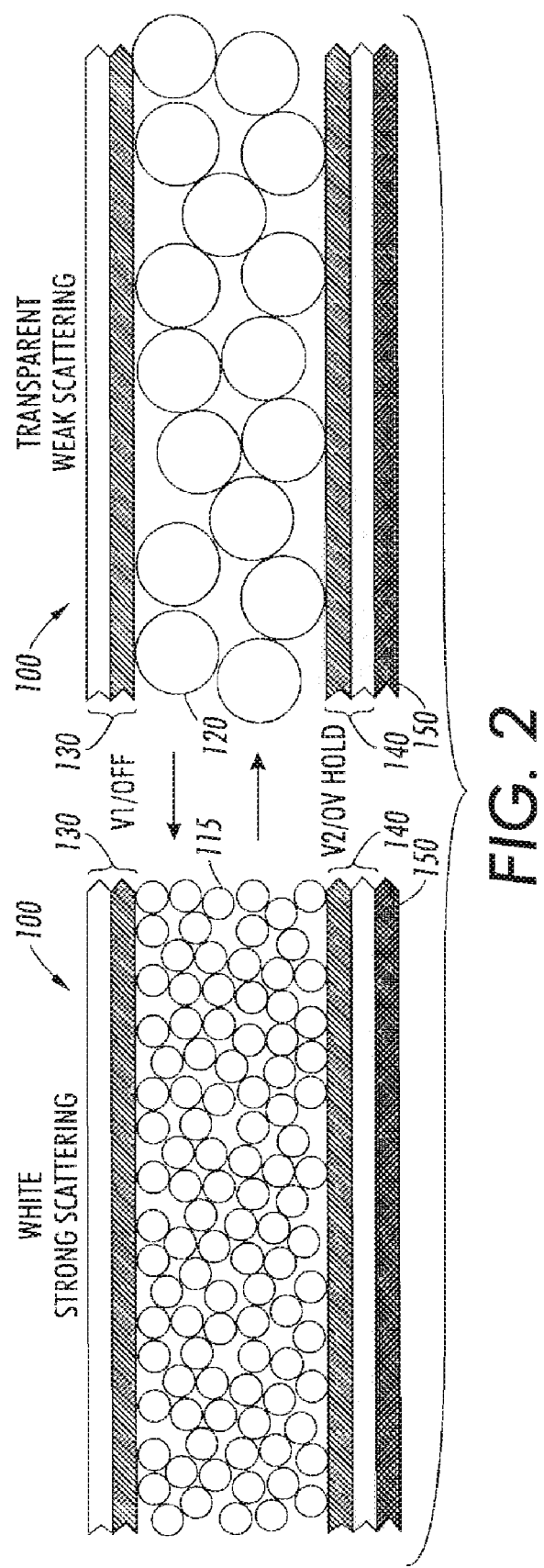
FIG. 2 illustrates an example structure of a domain controlled liquid crystal portion of the display device, and the switching of states therein.

FIG. 2 illustrates a domain controlled liquid crystal portion of the display device 100, wherein the liquid crystal composition 110 is switched between small size domains 115 in which the portion is strongly light scattering so that a viewer perceives a white color, and large size domains 120 in which the portion is weakly light scattering so as to appear substantially colorless and transparent. The portion is illustrated to include top and bottom conductive substrates 130, 140, respectively. Also included in this illustrated portion is a black background surface 150. In the transparent, weakly scattering, small domain state, the viewer would perceive the color black from the background surface color.

Display Device

The display device herein includes at least one of each of the electrophoretic display portion or layer and the domain controlled liquid crystal portion or layer in a stacked structure in which one of the portions is above or over the other of the portions. In embodiments, the device comprises an electrophoretic display layer over a domain controlled liquid crystal layer. In other embodiments, the device comprises a domain controlled liquid crystal layer over an electrophoretic display layer.

In the device, each of the portions or layers may be separated by inclusion of an additional layer, such as a film or substrate, between the two portions. The layer is desirably electrically insulating so as not to conduct any electric signal that may interfere with the control of each portion separately from the other. The layer is also desirably substantially transparent and colorless. As the layer, any suitable material may be used, including glass, plastic, and the like, and thus may be any of the materials described as substrate materials for the electrophoretic display portion above. The layer may have a thickness of from, for example, about 10 µm (or less) to about 10 mm (or more), for example from about 10 µm to about 1 mm or from about 100 µm to about 1 mm.

As was discussed above in the domain controlled liquid crystal section, the device may also include a colored background surface or substrate. This colored substrate is desirably located at a back surface of the display device away from the viewer. The colored background may either comprise a separate layer of the device, or it may be incorporated into a bottom portion of the bottom layer of the device, for example as a conductive substrate of the electrophoretic display layer or the domain controlled liquid crystal layer, or as a bottom of such layers inside of the conductive substrates and/or electrodes of the layers.

In the device, each portion of the device is controlled separately from the other portions. Thus, the electrophoretic display portion is controlled by an electric field applied to that portion, while the domain controlled liquid crystal portion associated with (that is, stacked over or under) the electrophoretic display portion is controlled by a separately applied electric field. Desirably, the stacked portions are arranged and/or controlled (for example, in terms of strength of the applied electric field to each separate portion) such that the electric field used to control one portion does not have any effect (for example, cause interference) in the associated other portion.

In the device, each reservoir of the electrophoretic display portion, for example representing one pixel or subpixel of the display device as discussed above, has a size corresponding with the size of the portion of the domain controlled liquid crystal portion with which the electrophoretic display portion is associated. Stated another way, the spacers in each of the electrophoretic display portions and the domain controlled liquid crystal portions may be made to be substantially aligned with each other.

In embodiments, the display device is thus comprised of a hybrid system made of a bistable domain controlled liquid crystal layer and a layer of a two particle electrophoretic display on a colored background. The domain controlled liquid crystal layer switches between a white and transparent state. The electrophoretic display layer switches between three states: color 1, color 2 and a transparent state, which is achieved by using an electrode design (top/bottom/lateral sides) in the electrophoretic display layer, where particles are moved laterally to create a transparent state. Overall, the system can show multiple color and levels of gray.

Figure 3:
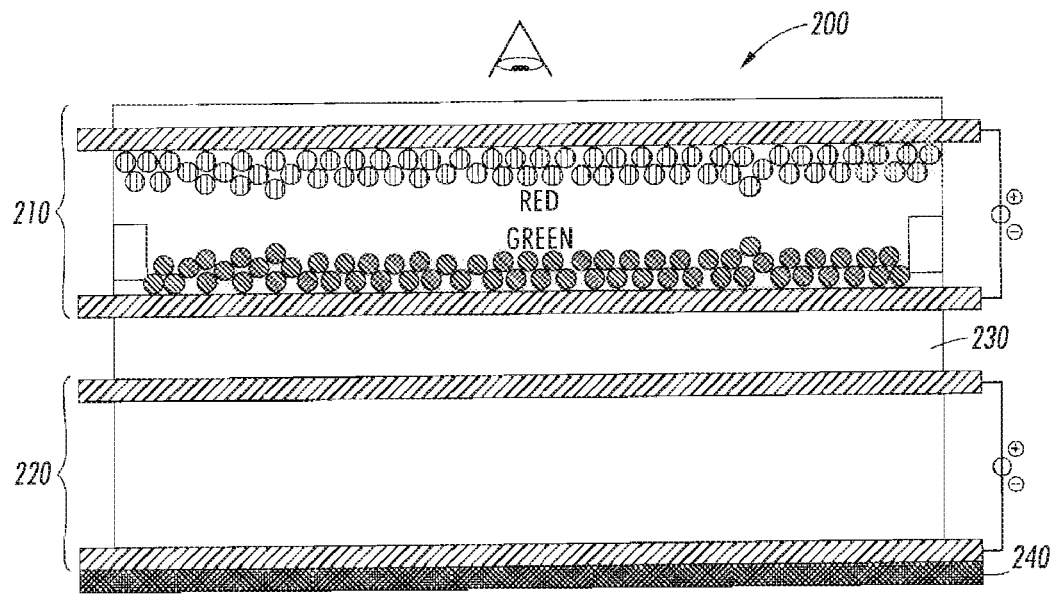
FIGS. 3 and 4 illustrate an example display device in which the electrophoretic display layer is located over the domain controlled liquid crystal layer.
Figure 4:
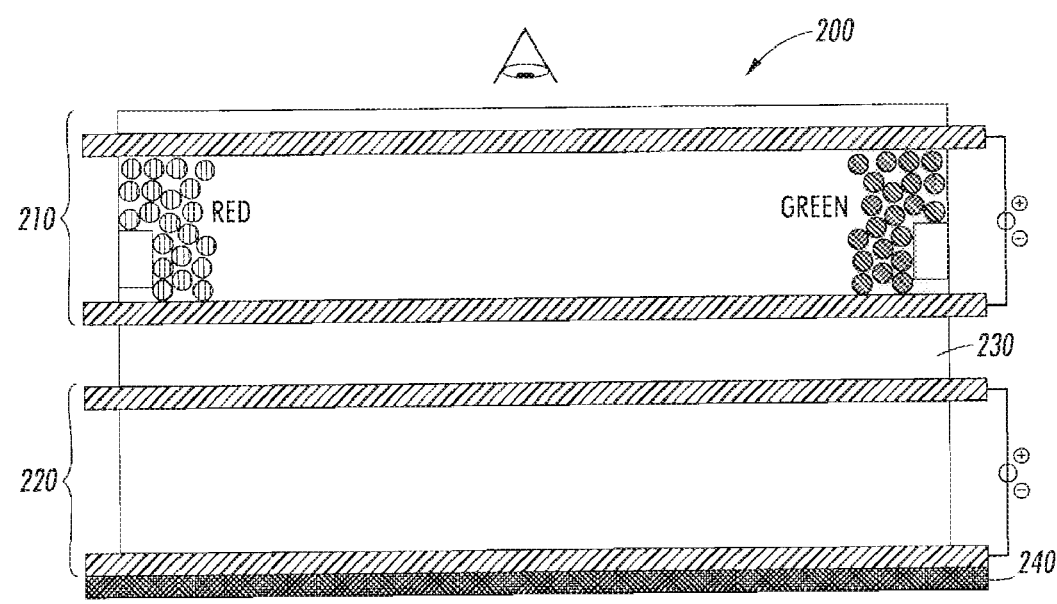
Figure 5:
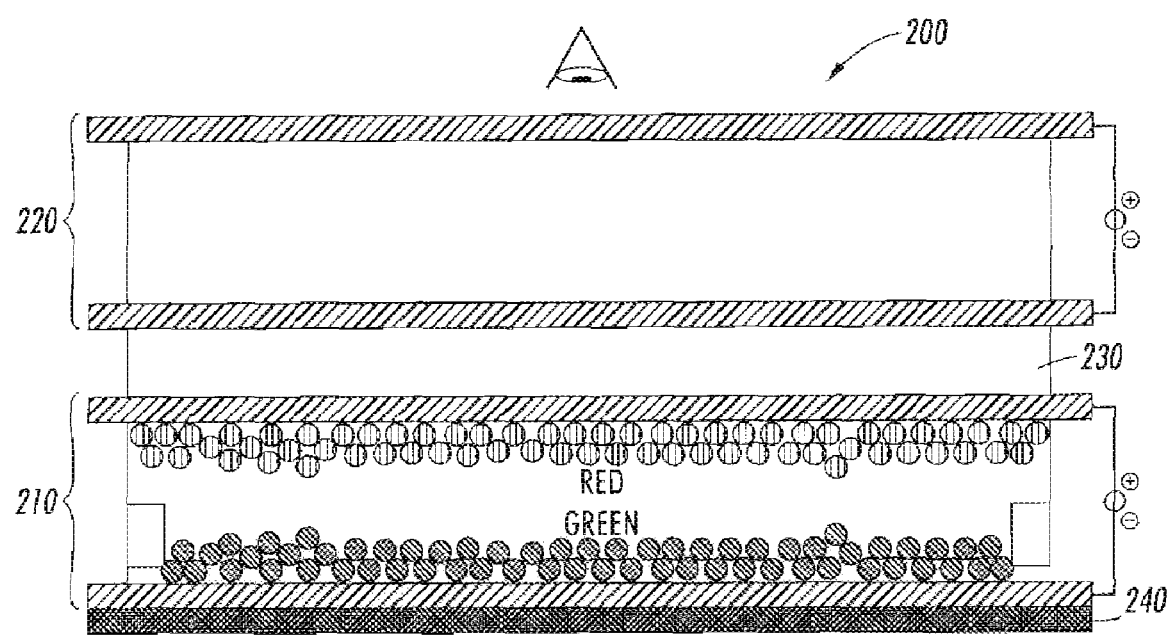
FIG. 5 illustrates an example display device in which the domain controlled liquid crystal layer is located over the electrophoretic display layer.

Further description of the display device is made with reference to FIGS. 3 to 5. In FIG. 3, the display device 200 has the electrophoretic display layer 2 10 over the domain controlled liquid crystal layer 220. In this case, the electrophoretic display layer includes a set of red particles and a set of green particles, each carrying an opposite charge. Thus, a viewer views the device from the electrophoretic display layer side of the device. A substantially transparent substrate 230 separates the electrophoretic display layer and the domain controlled liquid crystal layer. A colored background surface or substrate 240 is included at the back surface of the display device, and in this case is a blue background.

The display device of FIG. 3 can display full color images as follows. When the red particles of the electrophoretic layer are moved by an electric field to be on top (for example by applying a positive charge across the top conductive substrate or electrode when the red particles carry a negative charge), the viewer perceives the color red at this location of the device. When, on the other hand, the green particles of the electrophoretic layer are moved by an electric field to be on top (for example by applying a negative charge across the top conductive substrate or electrode when the green particles carry a positive charge), the viewer perceives the color green at this location of the device. In embodiments, if the electrophoretic display layer is sufficiently thin and/or substantially transparent, the red or green colors from above can have a lighter or a darker shade depending on the state of the domain controlled liquid crystal layer. The shade is lighter when the domain controlled liquid crystal layer is in the white state, and the shade is darker when the domain controlled liquid crystal layer is in the transparent state, in which case the blue background is more active, thereby darkening the shade of the red or green color. When the green and red particles of the electrophoretic layer are moved to respective sides of the layer and the domain controlled liquid crystal layer is in the white, strongly scattering state, then the viewer perceives the color white at this location of the device. Finally, when the green and red particles of the electrophoretic layer are moved to respective sides of the layer, for example as illustrated in FIG. 4, and the domain controlled liquid crystal layer is in the substantially transparent, weakly scattering state, then the viewer perceives the color blue at this location of the device (that is, the color of the background surface).

In FIG. 5, the display device 200 has the domain controlled liquid crystal layer 220 over the electrophoretic display layer 210. In this case, the electrophoretic display layer includes a set of red particles and a set of green particles, each carrying an opposite charge. Thus, a viewer views the device from the domain controlled liquid crystal layer side of the device. A substantially transparent substrate 230 separates the electrophoretic display layer and the domain controlled liquid crystal layer. A colored background surface or substrate 240 is included at the back surface of the display device, and in this case is a blue background.

The display device of FIG. 5 can display full color images as follows. When the domain controlled liquid crystal layer is in the substantially transparent, weakly scattering state, and the red particles of the electrophoretic layer are moved by an electric field to be on top (for example by applying a positive charge across the top conductive substrate or electrode when the red particles carry a negative charge) of that layer, the viewer perceives the color red at this location of the device. When the domain controlled liquid crystal layer is in the substantially transparent, weakly scattering state, and the green particles of the electrophoretic layer are moved by an electric field to be on top (for example by applying a negative charge across the top conductive substrate or electrode when the green particles carry a positive charge) of that layer, the viewer perceives the color green at this location of the device. When the domain controlled liquid crystal layer is in the white, strongly scattering state, then the viewer perceives the color white at this location of the device. Finally, when the domain controlled liquid crystal layer is in the substantially transparent, weakly scattering state, and the green and red particles of the electrophoretic layer are moved to respective sides of the layer, the viewer perceives the color blue at this location of the device (that is, the color of the background surface).

While the example devices described and illustrated above utilize red and green particle sets in the electrophoretic layer and a blue background, various color combinations may be used without restriction. That is, red, green and blue can each be made to appear as any of one of the colored particle sets or as the background color, as desired. Further, color combinations other than red, green and blue may be used, such as cyan, yellow and magenta as in typical color toner image applications.

Thus, in the display devices herein, the devices may be made to display each of the colors red, green and blue, along with white, thereby enabling display of full color images in an efficient manner.

In embodiments, color combination can be obtained with the display device, for example if one or both of the electrophoretic particles are translucent. In this case, it is possible to also obtain a black color if all three colors are visible from top of the display. For example, if subtractive color pigments (Cyan, magenta, and yellow) are used for the colored background and two particle types, overlapping translucent electrophoretic particles on top of the colored background will create a process black color.

It will be appreciated that various of the above disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A display device, comprising an electrophoretic display portion and a domain controlled liquid crystal portion, wherein the display device has a structure wherein either the electrophoretic display portion is arranged over the domain controlled liquid crystal portion or the domain controlled liquid crystal portion is arranged over the electrophoretic display portion, wherein the electrophoretic display portion includes a display medium with an electrical conductivity of about $10^{-11}$ to about $10^{-15}$ S/m.

2. The display device according to claim 1, wherein the device further comprises a colored background surface or substrate.

3. The display device according to claim 1, wherein the electrophoretic display portion comprises a multiplicity of individual reservoirs containing the display medium between conductive substrates and/or electrodes, wherein the display medium comprises two sets of differently colored particles in a dielectric fluid.

4. The display device according to claim 3, wherein the two sets of differently colored particles have an opposite charge.

5. The display device according to claim 3, wherein the individual reservoirs of the electrophoretic display portion are defined by spacers.

6. The display device according to claim 5, wherein the spacers in the electrophoretic display portion are substantially aligned with spacers in the domain controlled liquid crystal portion.

7. The display device according to claim 3, wherein at least one of the two sets of differently colored particles are translucent.

8. The display device according to claim 1, wherein the electrophoretic display portion comprises a multiplicity of individual reservoirs containing the display medium between substantially transparent conductive substrates and/or electrodes, wherein the display medium comprises two sets of differently colored particles in a dielectric fluid, wherein the device further comprises a colored background surface or substrate, and wherein each of the two sets of differently colored particles and the colored background surface or substrate are a different color.

9. The display device according to claim 8, wherein the different colors of the two sets of differently colored particles and the colored background surface or substrate are selected from among red, green and blue or from among cyan, yellow and magenta.

10. The display device according to claim 3, wherein the electrophoretic display portion further comprises a first electric field generating apparatus that electrically induces display of one of the two sets of differently colored particles in the display medium, and a second electric field generating apparatus that induces the two sets of differently colored particles to move to sides of the individual reservoirs.

11. The display device according to claim 10, wherein the first electric field generating apparatus is associated across top and bottom conductive substrates and/or electrodes of the electrophoretic display layer and the second electric field generating apparatus is associated across electrodes located on lateral sides of the individual reservoirs.

12. The display device according to claim 1, wherein the domain controlled liquid crystal portion comprises a liquid crystal composition including a liquid crystal and a liquid crystal domain stabilizing compound, wherein the liquid crystal composition switches between a strongly scattering state of a first plurality of liquid crystal domains that strongly scatters a predetermined light and a weakly scattering state of a second plurality of liquid crystal domains that weakly scatters the predetermined light, and a liquid crystal composition containment structure defining a space for the liquid crystal composition and including conductive substrates and/or electrodes.

13. The display device according to claim 12, wherein the domain controlled liquid crystal portion further comprises an electric field generating apparatus that electrically induces the change of the strongly scattering state to the weakly scattering state, and the change of the weakly scattering state to the strongly scattering state.

14. The display device according to claim 1, wherein the electrophoretic display portion is arranged over the domain controlled liquid crystal portion.

15. The display device according to claim 1, wherein the domain controlled liquid crystal portion is arranged over the electrophoretic display portion.

16. The display device according to claim 1, wherein the device further comprises a substantially transparent layer between the electrophoretic display portion and the domain controlled liquid crystal portion.

17. A method of displaying a color image with a display device, wherein the display device has a structure wherein an electrophoretic display portion is arranged over a domain controlled liquid crystal portion, the method comprising displaying a first color of one of two sets of differently colored particles in the electrophoretic display portion by applying an electric field to move the first colored particles to a top of the electrophoretic display portion, displaying a second color of the other one of the two sets of differently colored particles in the electrophoretic display portion by applying an electric field to move the second colored particles to a top of the electrophoretic display portion, displaying a third color of a background surface or substrate by applying an electric field to move the first colored particles and the second colored particles of the electrophoretic display portion to side portions of the electrophoretic display portion and by applying a separate electric field to the domain controlled liquid crystal portion to induce a change to a weakly scattering, substantially transparent state, and displaying a white color by applying an electric field to move the first colored particles and the second colored particles of the electrophoretic display portion to side portions of the electrophoretic display portion and by applying a separate electric field to the domain controlled liquid crystal portion to induce a change to a strongly scattering state.

18. The method according to claim 17, wherein the displaying of the first color and/or the displaying of the second color further comprises applying a separate electric field to the domain controlled liquid crystal layer to control shade of the first color or second color.

19. The method according to claim 18, wherein the shade of the first color or the second color is made lighter by applying the separate electric field to the domain controlled liquid crystal portion to induce a change to a strongly scattering state and the shade of the first color or the second color is made darker by applying the separate electric field to the domain controlled liquid crystal portion to induce a change to a weakly scattering, substantially transparent state.

20. The method according to claim 17, wherein the two sets of colored particles of the electrophoretic portion are translucent so that a black color may be displayed by applying an electric field to the domain controlled liquid crystal portion to induce a change to a weakly scattering, substantially transparent state and by displaying the two sets of differently colored translucent particles.

21. A method of displaying a color image with a display device, wherein the display device has a structure wherein a domain controlled liquid crystal portion is arranged over an electrophoretic display portion, the method comprising displaying a first color of one of two sets of differently colored particles in the electrophoretic display portion by applying an electric field to the domain controlled liquid crystal portion to induce a change to a weakly scattering, substantially transparent state and by applying a separate electric field to move the first colored particles to a top of the electrophoretic display portion, displaying a second color of the other one of the two sets of differently colored particles in the electrophoretic display portion by applying an electric field to the domain controlled liquid crystal portion to induce a change to a weakly scattering, substantially transparent state and by applying a separate electric field to move the second colored particles to a top of the electrophoretic display portion, displaying a third color of a background surface or substrate by applying an electric field to the domain controlled liquid crystal portion to induce a change to a weakly scattering, substantially transparent state and by applying a separate electric field to move the first colored particles and the second colored particles of the electrophoretic display portion to side portions of the electrophoretic display portion, and displaying a white color by applying a separate electric field to the domain controlled liquid crystal portion to induce a change to a strongly scattering state.

22. The method according to claim 21, wherein the two sets of colored particles of the electrophoretic portion are translucent so that a black color may be displayed by applying an electric field to the domain controlled liquid crystal portion to induce a change to a weakly scattering, substantially transparent state and by displaying the two sets of differently colored translucent particles.

* * * * *